US011329407B2

(12) United States Patent
Krapp et al.

(10) Patent No.: US 11,329,407 B2
(45) Date of Patent: *May 10, 2022

(54) METHODS AND SYSTEMS FOR UTILIZING IDEAL TAPS IN COAXIAL NETWORKS

(71) Applicant: MaxLinear, Inc., Carlsbad, CA (US)

(72) Inventors: Steven John Krapp, Carlsbad, CA (US); Sridhar Ramesh, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,471

(22) Filed: Aug. 5, 2020

(65) Prior Publication Data

US 2020/0366007 A1 Nov. 19, 2020

Related U.S. Application Data

(63) Continuation of application No. 16/000,491, filed on Jun. 5, 2018, now Pat. No. 10,950,956.

(60) Provisional application No. 62/515,340, filed on Jun. 5, 2017.

(51) Int. Cl.
*H04N 21/60* (2011.01)
*H01R 9/05* (2006.01)
*H04L 12/54* (2022.01)
*H04L 5/14* (2006.01)
*H04N 7/10* (2006.01)
*H04L 12/70* (2013.01)

(52) U.S. Cl.
CPC ............ *H01R 9/0509* (2013.01); *H04L 5/14* (2013.01); *H04L 12/5601* (2013.01); *H04N 7/102* (2013.01); *H04N 7/104* (2013.01); *H04L 2012/561* (2013.01); *H04N 21/60* (2013.01)

(58) Field of Classification Search
CPC ....................................................... H04N 21/60
See application file for complete search history.

(56) References Cited

U.S. PATENT DOCUMENTS

| 2012/0044361 | A1* | 2/2012 | Riggsby | ................ | H04N 7/104 348/192 |
| 2012/0054805 | A1* | 3/2012 | Shafer | ................ | H04L 12/2801 725/78 |

* cited by examiner

*Primary Examiner* — Michael H Hong
(74) *Attorney, Agent, or Firm* — McAndrews, Held & Malloy, Ltd.

(57) ABSTRACT

An ideal tap may have a plurality of ports that include at least an input port configured for receiving downstream (DS) signals from and transmitting upstream (US) signals to nodes upstream from the tap within the coaxial network, and one or more other ports that comprise at least one of an output port configured for transmitting downstream (DS) signals to and receiving upstream (US) signals from nodes downstream from the tap within the coaxial network, and a drop port for receiving signal from and transmitting signals to customer premise equipment (CPE) in the coaxial network. The ideal tap may further include processing circuits for handling signals received and transmitted via the tap, with the one or more processing circuits being configured to meet particular predefined tap performance criteria, and to specifically apply, during handling of signals in the tap, frequency shifting based on one or more frequency spectrum shift conditions.

20 Claims, 19 Drawing Sheets

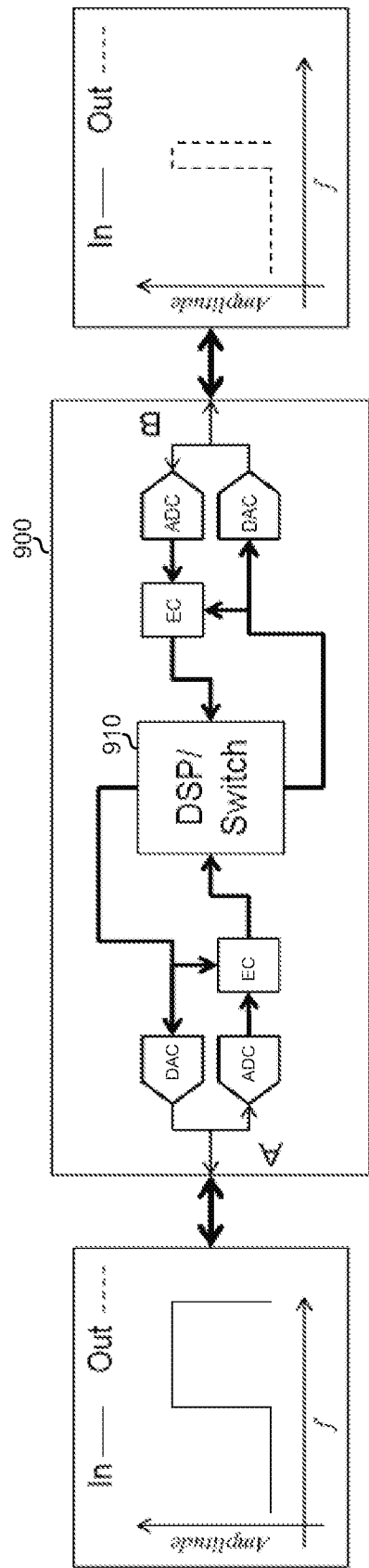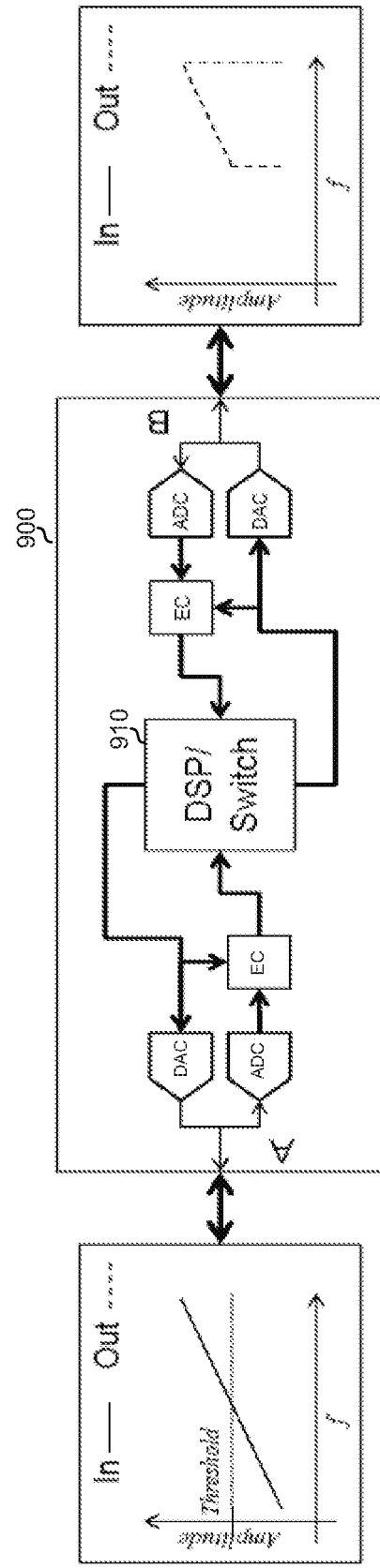

METHODS AND SYSTEMS FOR UTILIZING IDEAL TAPS IN COAXIAL NETWORKS

CLAIM OF PRIORITY AND CROSS-REFERENCE TO RELATED APPLICATIONS

This patent application is a continuation of U.S. patent application Ser. No. 16/000,491, filed Jun. 5, 2018, which in turn makes reference to, claims priority to and claims benefit from U.S. Provisional Patent Application Ser. No. 62/515,340, filed Jun. 5, 2017. Each of the above identified applications is hereby incorporated herein by reference in its entirety.

This patent application relates to U.S. patent application Ser. No. 16/659,170, filed on Oct. 21, 2018, which in turn makes reference to, and claims priority from U.S. Provisional Patent Application Ser. No. 62/748,426, filed on Oct. 20, 2018. Each of the above identified applications is hereby incorporated herein by reference in its entirety.

TECHNICAL FIELD

Aspects of the present disclosure relate to communication solutions. More specifically, certain implementations of the present disclosure relate to methods and systems for utilizing low gain low noise signal amplification and high forward to reverse path isolation using ideal taps in coaxial networks.

BACKGROUND

Various issues may exist with conventional approaches for designing and implementing cable networks, particularly coaxial cable based ones. In this regard, conventional systems and methods, if any existed, for designing and implementing coaxial cable plants, can be costly, inefficient, and/or ineffective.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a methods and systems for utilizing low gain low noise signal amplification and high forward to reverse path isolation using ideal taps in coaxial networks, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 9A-9J illustrate various example use scenarios of ideal taps when configured for operation as 2-port digital repeaters.

DETAILED DESCRIPTION OF THE INVENTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1:
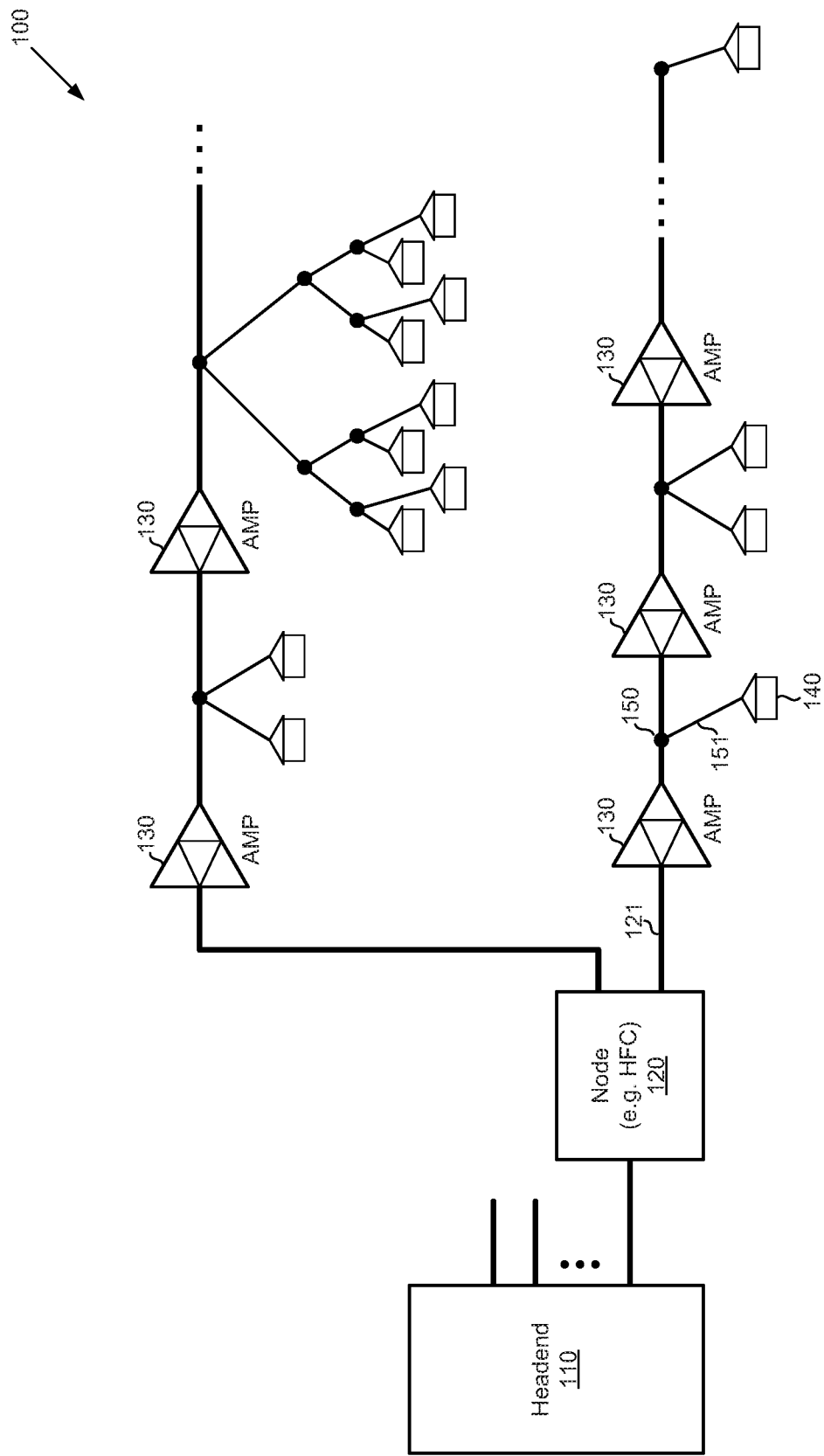
FIG. 1 illustrates an example cable network.

FIG. 1 illustrates an example cable network. Referring to FIG. 1, there is shown a plant 100, which may correspond to an example cable network distribution plant. The plant 100 may be a hybrid fiber-coaxial (HFC) based plant.

The plant 100 may comprise a headend 110, connected to one or more distribution (e.g., HFC) nodes 120, with each node 120 connecting to plurality of user equipment (e.g., customer premise equipment (CPE), such as data over cable service interface specification (DOCSIS) modems (or cable modems (CMs)), television set-top boxes, etc.) 140 residing in customers' (subscribers') premises.

The headend 110 may comprise suitable circuitry for supporting headend operations and/or functions. For example, the headend 110 may support several heterogeneous services (e.g., DOCSIS, video on demand (VOD), switched digital video (SDV), out-of-band control signals (OOB), broadcast analog and/or digital television based services, etc.) and may be operable to generate downstream signals combining content (e.g., video or other data) from the different supported services, for communication over HFC based distribution network to end-user equipment (e.g., CPEs 140).

The node 120 may comprise suitable circuitry for converting signals between the headend 110 and the CPEs 140. In this regard, node(s) 120 may facilitate communication of downstream (DS) signals to the users and communication of upstream (US) signals from the end users to the headends. Accordingly, within the cable plant, each node 120 is a source of downstream (DS) signals and a sink of upstream (US) signals, whereas each CPE 140 is a source of upstream (US) signals and a sink of downstream (DS) signals. The node 120 may convert, for example, optical signals to electrical signals in the downstream (from the headend 110), and may convert electrical signals to optical signals in the upstream (to the headend 110).

The node(s) 120 may communicate with the CPEs 140 over coaxial cables, which may comprise "trunk coax" connections 121 that the user equipment may be connected to via "drop coax" connections 123. In this regard, bidirectional line amplifiers 130 may be utilized, being placed in the coaxial connections between each node 120 and the CPEs 140 coupled thereto. The placement of the amplifiers 130 may be determined in adaptive manner (e.g., based on a determination of where application of amplification may be needed, such as based on distance and/or number of CPE(s) in each amplification stage). Each of the amplifiers 130 may comprise circuitry for providing amplification bidirectionally (i.e., in both directions—that is, upstream and downstream). For example, each amplifier 130 may apply amplification gain to upstream and downstream signals between the node 120 and the CPEs 140 coupled to it. In this regard, each of the amplifiers 130 may be configured to apply different amplification gain in the upstream and downstream direction.

Further, taps 150 may be used for coupling the user equipment to the truck coax connections 121. In this regard, taps are implemented in existing networks as passive devices that are used to split DS signals and combine US signals, to connect a plurality of homes to the coax network, and to propagate signals to/from the next tap.

In an example implementation, the plant 100 may be configured such that devices and/or systems downstream from the headends (e.g., the node 120, one or more of the amplifiers 130, and/or one or more of the CPEs 140 may be implemented as 'intelligent' platforms, such as to enable monitoring and reporting (e.g., of control information) to the headends—e.g., monitoring upstream and/or downstream activities, reporting signal characteristics, etc. For example, the node 120, one or more of the amplifiers 130, and/or one or more of the user equipment in customer premises 140 may incorporate cable modem (or a reduced complexity/functionality cable modem) functions, with each cable modem function comprising a full-spectrum capture, for capturing and reporting frequency-domain snapshots of the HFC plant.

Certain issues and/or limitations may be present in existing cable networks. For example, existing coaxial networks may utilize high gain amplification of signals in order to overcome the inherent losses of the network. In this regard, amplifiers (e.g., amplifiers 130 in plant 100) may be added after a number of taps to boost and re-equalize signals after the signal level becomes too low. Despite its success and widespread use, however, use of high gain amplification has its limitations. For example, amplifiers add noise. Also, because amplifiers are active components, they require power. Existing amplifiers have typically been monitor-able. In addition, to accommodate use in the bidirectional environment of the cable networks, amplifiers require diplexers to segregate the US signals from the DS signals. In this regard, diplexers are fixed elements that must be replaced in order to change the ratio of US and DS spectrum. Further, amplifiers are fixed in the spectrum that they can address.

Thus, various implementations in accordance with the present disclosure may enhance performance and optimize use of cable networks. For example, ideal taps may be used to optimize use of coaxial connections, particularly with respect to the amplification and related adjustments typically required to facilitate communication of signals over such coaxial connections. Further, new coaxial designs and network plans that incorporate use of such ideal taps, as low gain low noise amplifiers for example, to enhance performance. This is a net result of deploying the taps in distributed fashion as each tap is required to provide only enough gain to overcome a single segment of coaxial cable of modest length.

The low gain allows for greater linearity in the amplification of the signal, which provide improved efficiency. The ideal tap also provides high isolation and return loss. In addition to improving coaxial network planning and design, use of such ideal taps may reduce operational burden and allow for improved troubleshooting during use of the cable networks.

Figure 2:
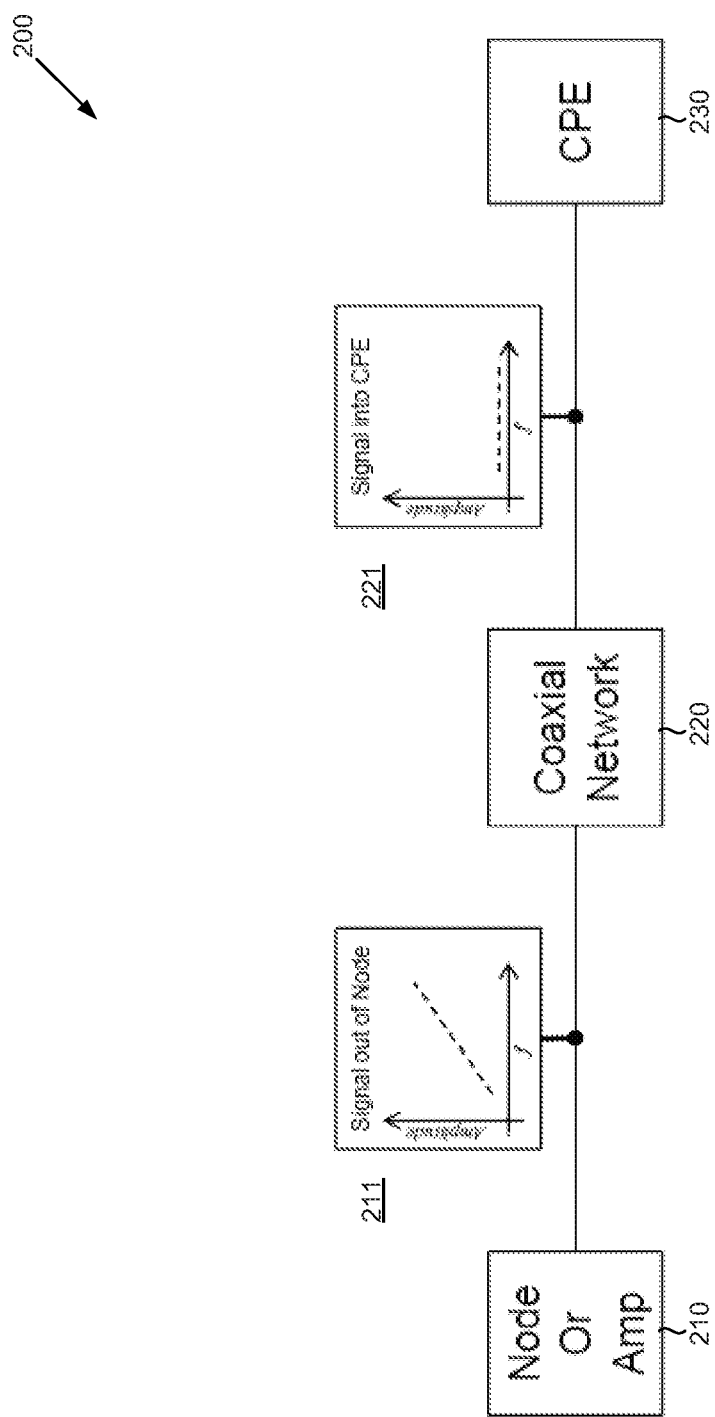
FIG. 2 illustrates an example coax design in existing networks.

FIG. 2 illustrates an example coax design for use in existing networks. Shown in FIG. 2 is a (portion of) cable plant 200 implemented in accordance with traditional coax design.

The cable plant 200 comprises a node (or amplifier) 210 communicating signals to a customer-provided equipment (CPE) 230 via coaxial network (cabling) 220. Coaxial cables naturally exhibit a "coaxial loss" (to the signals communicated via the coaxial cables), which is typically a function of frequency and length. For example, coaxial loss may be expressed as:

$$\text{coaxial loss} \sim = \text{sqrt}(f) * \text{length} + K$$

where f is frequency of the signal traversing the cabling, "length" is the length of coaxial cable, and K is a constant give for a specific cable construction.

This "coaxial loss" may cause issues, particularly for certain conditions. For example, in long setups (e.g., with large "length"), such uneven loss may create large variations between signals having low frequencies and those having high frequencies. In accordance with traditional coax design based approaches, such losses are accounted for, such as by compensating through equalization at signal launch. For example, the output of the node or the CPE may be pre-emphasized with more power at higher frequencies. This is referred to as an "up-tilt" or just "tilt."

With reference to the particular implementation shown in FIG. 2, the output of the node (or amplifier) 210 is configured to incorporate a tilt into its output signal (as shown in signal chart 211). In this regard, the amount of "tilt" is dependent upon various factors, such as the length of cable (to the target CPE), the end-of-line desired signal level, and the frequency width of the signals used for communication. The tilt is designed such that the signal is relatively flat (e.g., as shown in signal chart 221) when received at the CPE.

Because individual CPEs are connected to the coaxial network at different locations, each CPE may have a unique transfer function from the nearest node (or amplifier). In traditional coax designs, to compensate for this uniqueness in transfer function, CPEs may be grouped onto taps which serve multiple CPEs; with each tap having a particular corresponding tap value that adds loss to minimize the difference seen by an individual CPE; and each tap may also have a slot in which additional equalization can be added. In a well-designed system the transfer function from the node to each of the CPE is nearly identical. This is illustrated in FIG. 3.

Figure 3:
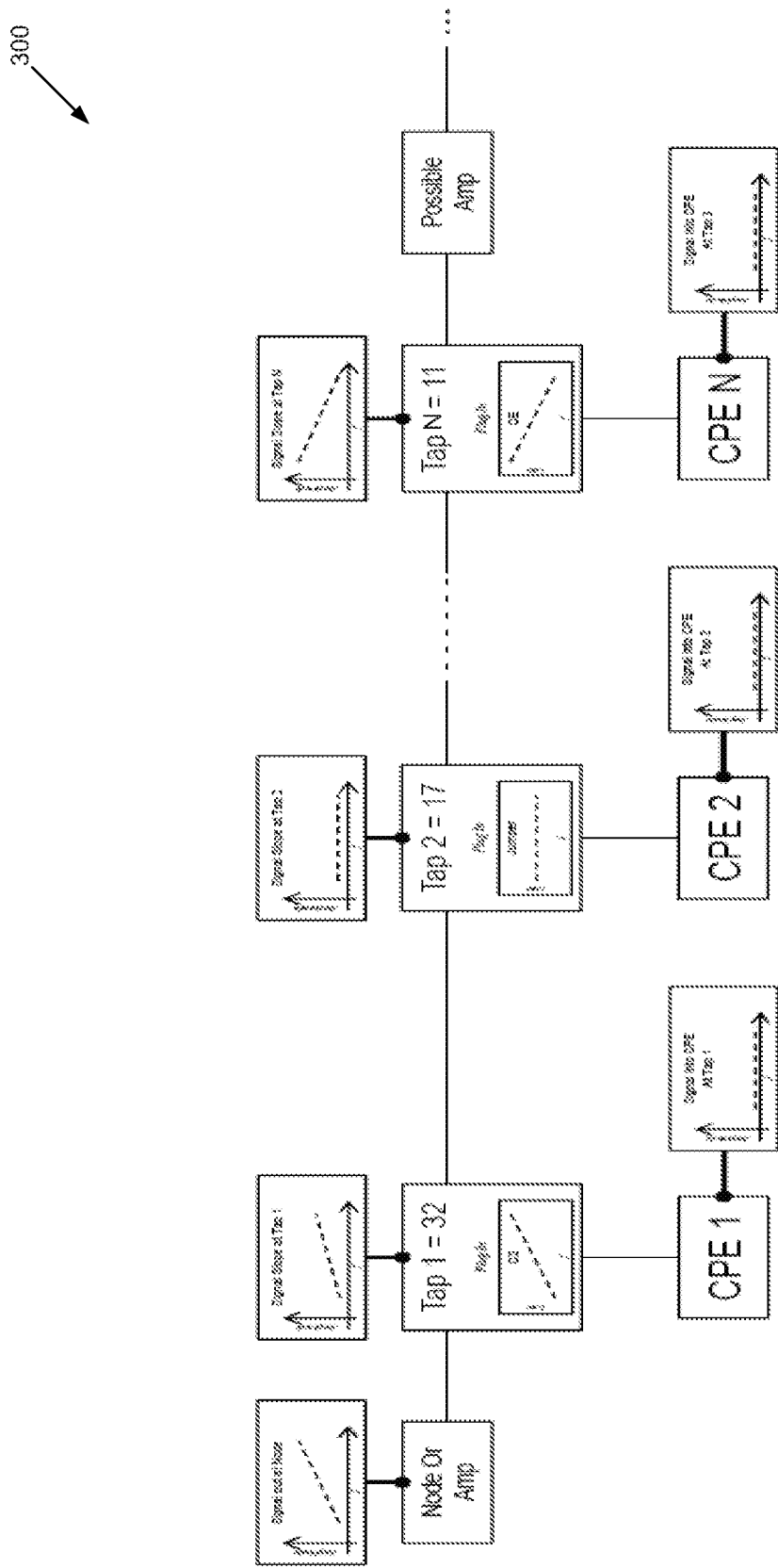
FIG. 3 illustrates signal profiles at different points in a coax segment of an example cable network implemented in accordance with traditional coax design.

FIG. 3 illustrates signal profiles at different points in a coax segment of an example cable network implemented in accordance with traditional coax design. Shown in FIG. 3 is a (portion of) cable plant 300 implemented in accordance with a traditional coax design.

In this regard, the cable plant 300 comprises a plurality of taps, each used for coupling one or more CPEs to the coaxial cable network. As noted above, with traditional coax design, each tap may be assigned a unique tap value. In this regard, the "tap value" may be the amount of passive loss a tap imparts across—that is, from the tap input port (tap-in) to the tap drop ports. Taps come with different values. In this regard, the further a tap is in the system the lower the tap value specified in the design is. Taps may also be configured to provide (e.g., via plug-in modules) frequency dependent equalization via passive components. As with the tap values, with traditional cable design, taps may have different equalization characteristics. For example, some taps may incorporate a Cable Equalizer (CE), configured for more loss at low frequencies (e.g., to counteract the effect of the coaxial cable); a Cable Simulator (CS), configured for more loss at high frequencies (e.g., to simulate a longer length of coaxial cable); or a "Jumper," configured for flat response with little to no loss (e.g., for use when no conditioning is needed). Thus, in the example cable plant 300 shown in FIG. 3, Tap 1 (near the node or amplifier) has a CS plug-in; Tap 2 has a Jumper plug-in; and Tap N (near the end of the cable, before the next amplifier) has a CE plug-in, to ensure that the CPE(s) connected to each of these taps receive substantially similar flat signals.

Various issues and limitations exist with traditional coax design. In particular, a lot of expertise and knowledge is required to design a proper system, specifically when determining coaxial losses and required adjustments at different points in the network to counteract the effects of these losses. Also, there are a finite set of tap, CE, and CS values. As a consequence, not all CPEs receive flat signals, particularly in situations where there are multiple CPEs connected to the same tap (e.g., not all premises attached to the same tap have the same length of cable); rather, some CPEs may receive signals with some tilt (e.g., 3 to 6 dBs). Even with infinite choice for tap, CE, and CS values, the length of cable between the tap and the home will vary the system transfer function.

In addition, taps have low isolation. In this regard, neighboring CPE may "hear" each other. This low isolation causes various problems—e.g., makes full-duplex (FDX) systems near impossible at the CPE, and makes time-division duplexing (TDD) systems (e.g., such as MoCA based systems) difficult to deploy and use, and/or necessitate use of particular solutions to counteracts such issues (e.g., filters are added to a CPE to prevent its MoCA transmissions from being heard by its neighbors). Further, taps have low return loss. In this regard, as a consequence of such low return loss complicated Micro-reflections are ever present creating inter-symbol interference (ISI), and FDX becomes difficult as multiple echoes from multiple taps need to be tracked and canceled.

In addition, because taps are also passive components, various use limitations may exist. For example, taps cannot be monitored remotely, cannot change configuration remotely (e.g., ports enable/disable), cannot block ingress noise, and cannot notch out undesired spectrum. Power consumption may also be high in traditional coax designs. In this regard, high output power is required at the node and CPE to overcome large plant losses (e.g., 74 dBmV total composite power (TCP) at the node and 65 dBmV TCP at the CPE). CPEs can consume 5 W, and possibly twice as much as this when FDX becomes available. All CPEs must transmit at high power (including those close to the nodes or amplifiers). Nodes may consume 18 W or more per 32 households passed (HHP).

In addition, modulation error ratio (MER) performance may be low (e.g., node fidelity is limited to about 41 dB with current technology to achieve the needed output power), HHP per segment may be low (e.g., typically 30 to 50 HHP), frequency allocation for US and DS directions may be fixed by physical diplexers, and allocation is the same for all CPE in the system (e.g., CPE which use different splits suffer degraded performance.

Many of these issues (and more) may be overcome by use of "ideal" taps, as described below. In this regard, such ideal taps may have characteristics that address some of the issues associated with traditional coax designs and/or obviate the need for some of the added measures (e.g., tilt and related adjustments) or components (e.g., plug-in modules) required in these designs, as explained in more detail below.

Figure 4:
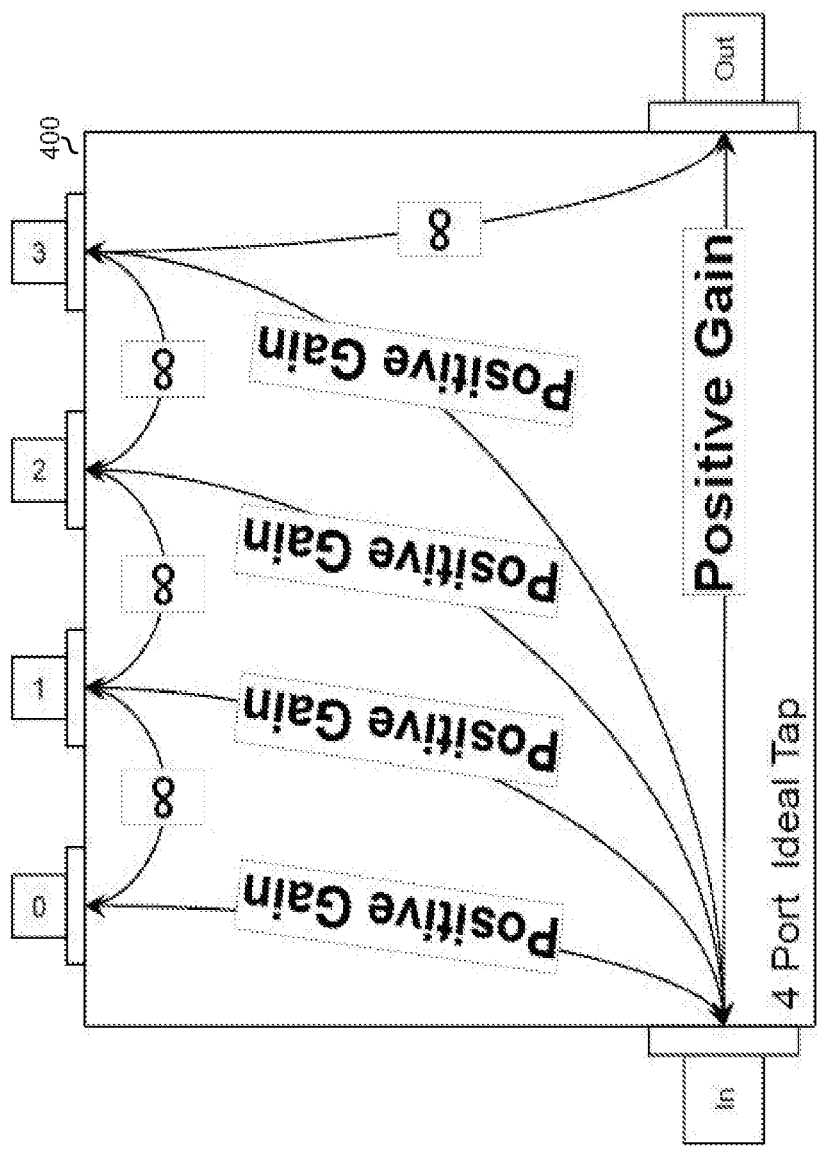
FIG. 4 illustrates performance profile of an example N-port ideal tap.

FIG. 4 illustrates performance profile of an example N-port ideal tap. Shown in FIG. 4 is an N-port (e.g., 4 ports, as shown in FIG. 4) ideal tap 400.

The ideal tap 400 may comprise suitable circuitry for providing tap-related functions in cable networks—e.g., allowing coupling of CPEs to coax cable networks (particularly to the trunk coax portions). As shown in FIG. 4, the ideal tap 400 is a 4-port tap—that is, with 6 ports: an "in" port (or "in-port"), an "out" port (or "out-port"), and 4 "drop" ports (or "drop-ports"). In this regard, the drop-ports are used for coupling CPEs into the coax network. Nonetheless, it should be understood that the disclosure is not limited to the use of 4 drop-ports, and that a different number of drop-ports can be used in different implementations.

In particular, the ideal tap 400 may be designed and configured as an "ideal" tap—that is, having characteristics that provide ideal performance, thus overcoming at least some of the limitations and/or issues noted above with respect to traditional coax design.

In this regard, an ideal tap may have, for example, infinite band pass, infinite isolation, infinite return loss, an in-any (e.g., from the in-port to any of the 4 drop-ports or to the out-port) gain that is enough to overcome loss in the coaxial drop cable from the CPE to the tap (e.g., up to ~200 feet), an out-in (e.g., from the out-port to the in-port) gain that is enough to overcome loss in trunk cable attached between taps (e.g., up to ~200 feet), can remove undesired signals, can disable/enable ports remotely, can communicate information related to itself (e.g., status, metrics, etc.), consumes no (or minimal) power, does not add noise, and can remove noise. Example implementations of such ideal taps are described with respect to FIGS. 5 and 6.

Figure 5:
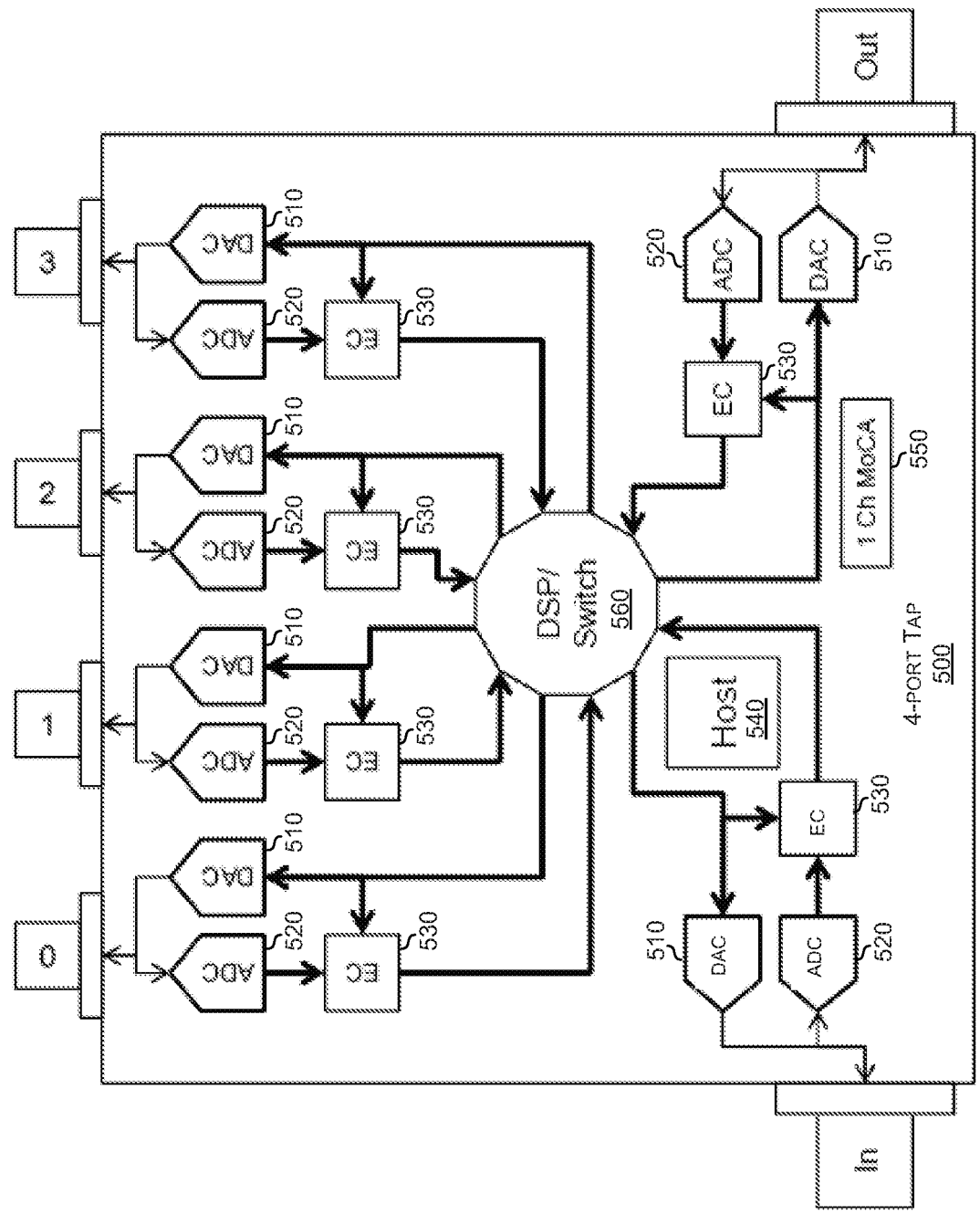
FIG. 5 illustrates an example implementation on an N-port ideal tap.

FIG. 5 illustrates an example implementation on a N-port ideal tap. Shown in FIG. 5 is an N-port (e.g., 4-port as shown in FIG. 5) ideal tap 500.

The ideal tap 500 may comprise suitable circuitry for providing tap-related functions in cable networks, and to particularly do so as an "ideal" tap as described above with respect to FIG. 4 for example. As with the ideal tap 400, the ideal tap 500 is also shown as a 4-port tap—that is, with an in-port, an out-port, and 4 drop-ports.

The ideal tap 500 may comprise circuits for processing signals received and transmitted via each of the ports, such as digital-to-analog converter (DAC) circuits 510, analog-to-digital converter (ADC) circuits 520, and echo cancelation (EC) circuits 530, which may be arranged in the manner shown in FIG. 5. In this regard, the EC circuits 530 are used for cancelling echo on each port as echoes do not propagate as such so echo cancelation only needs to accommodate—e.g., for at most 250' of cable.

The ideal tap 500 may further comprise a host processor 540, a Multimedia over Coax Alliance (MoCA) controller 550, and a digital signal processor (DSP)/switch 560. The host processor 540 may comprise suitable circuitry for managing and controlling the tap 500 and operations thereof. The MoCA controller 550 may comprise suitable circuitry for facilitating MoCA based communication (e.g., using 1 channel). The DSP/switch 560, which may comprise suitable circuitry for performing digital signal processing functions, as well as handling switching within the ideal tap 500. In this regard, switching within the tap comprises providing signal paths and/or routing signals within the ideal tap 600 between the different ports.

The ideal tap 500 may be configured to enable and support bandwidth of 1.2 Gbps minimum, and a goal bandwidth of 3 to 6 Gbps. Further, with 10 bps/Hz a bandwidth of 30 to 60 Gbps may be achieved. The ideal tap 500 may also be configurable to have a high return loss (e.g., 30 to 50 dB) and high port-to-port isolation (e.g., 50 to 70 dB), low power consumption The ideal tap 500 may be configured to utilize IEEE 1588. Further, along with the performance improvements, the ideal tap 500 may also have economic advantages.

Figure 6:
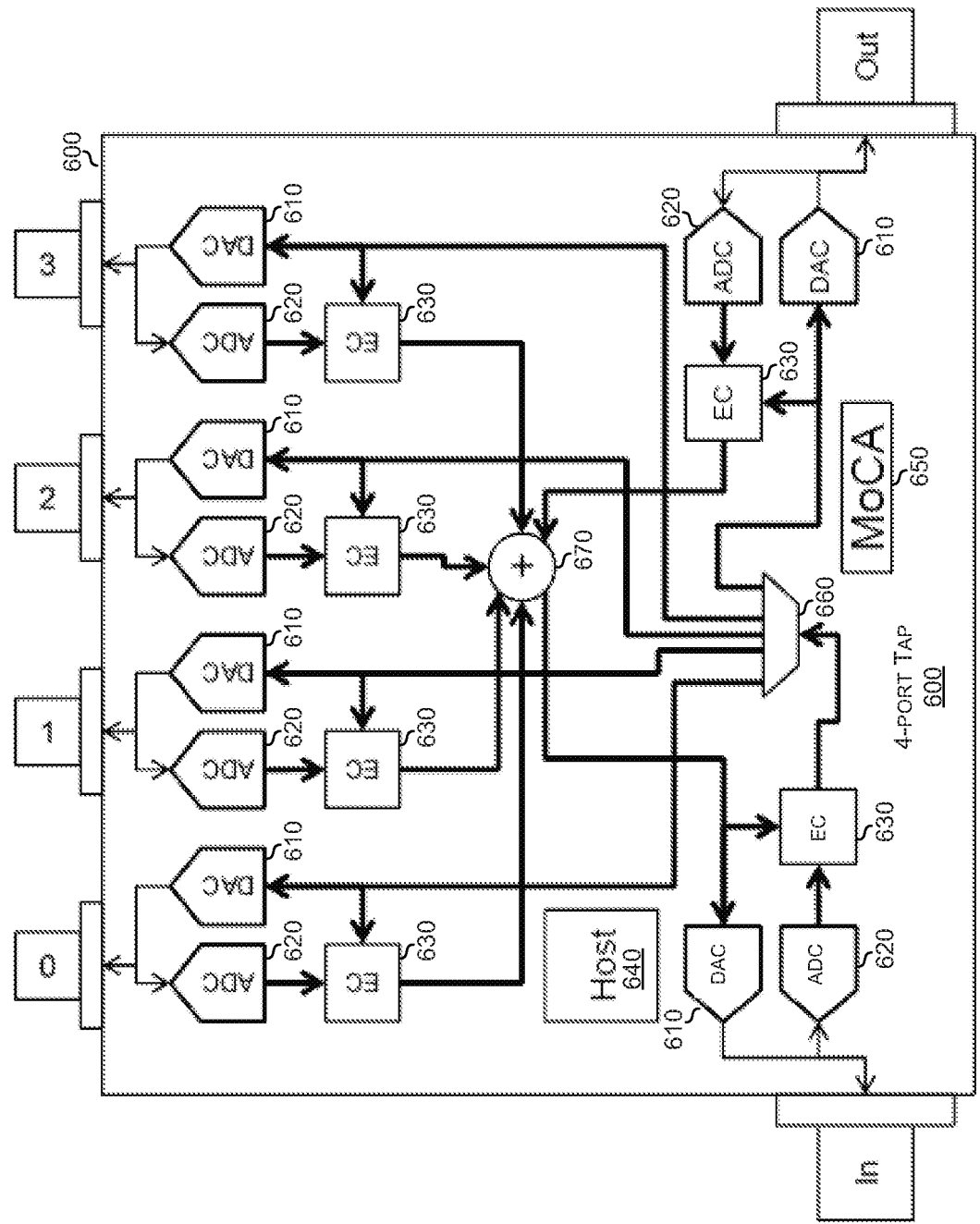
FIG. 6 illustrates another example implementation on an N-port ideal tap.

FIG. 6 illustrates another example implementation on a N-port ideal tap. Shown in FIG. 6 is an N-port (e.g., 4-port as shown in FIG. 6) ideal tap 600.

The ideal tap 600 may comprise suitable circuitry for providing tap-related functions in cable networks, and to particularly do so as an "ideal" tap as described above with respect to FIGS. 4 and 5 for example. As with the ideal tap 500, the ideal tap 600 is also shown as a 4-port tap—that is, with an in-port, an out-port, and 4 drop-ports.

The ideal tap 600 may be substantially similar to the ideal tap 500 described above, for example. Thus, the ideal tap 600 may similarly comprise digital-to-analog converter (DAC) circuits 610, analog-to-digital converter (ADC) circuits 620, and echo cancelation (EC) circuits 630, which may be utilized for processing signals received and transmitted via each of the ports, with these circuits being arranged in substantially the same manner, as shown in FIG. 6, and which may be arranged in the manner shown in FIG. 6.

Further, the ideal tap 600 may similarly comprise a host processor 640 and a Multimedia over Coax Alliance (MoCA) controller 650, which may be substantially similar to (and function similarly as) the host processor 540 and the MoCA controller 550 of the ideal tap 500 described with respect to FIG. 5. However, the ideal tap 600 may utilize a different design for handling switching within the tap. In this regard, the ideal tap 600 may utilize a multiplexer 660 and a combiner 670, for handling switching functions within the ideal tap 600 (e.g., providing signal paths and/or routing signals within the ideal tap 600 between the different ports). Nonetheless, the ideal tap 600 may be configured similar to the ideal tap 500, and may have substantially similar characteristics (e.g., bandwidth, cost, power consumption, etc.) as described above.

Figure 7A:
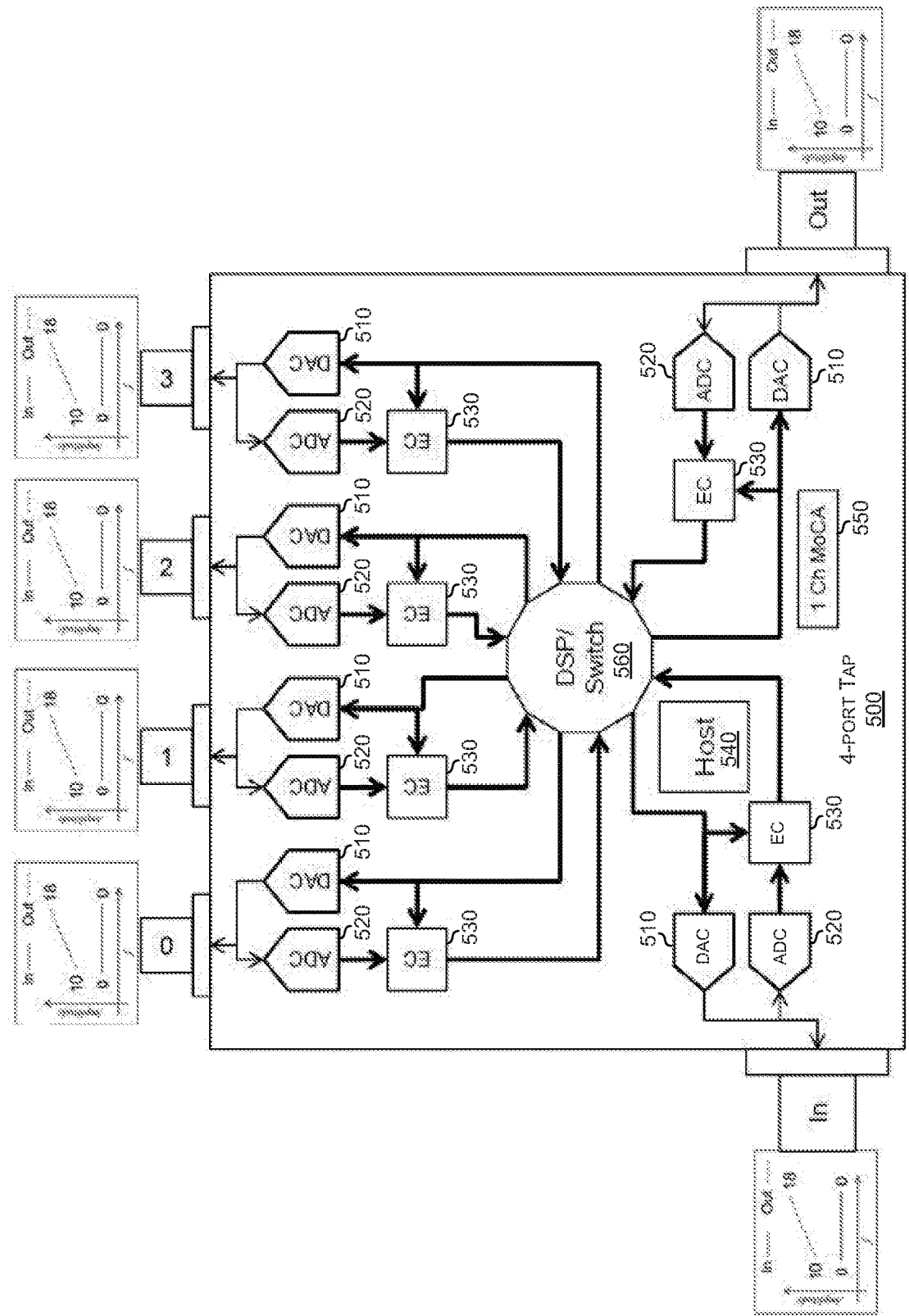
FIG. 7A illustrates use of an example N-port ideal tap.

FIG. 7A illustrates use of an example N-port ideal tap. Shown in FIG. 7A is an ideal tap in accordance with the present disclosure (specifically, an instance of the ideal tap 500 described with respect to FIG. 5, for example).

Illustrated in FIG. 7A are characteristics of input and output signals of ideal taps during use (e.g., in cable networks). In this regard, target input to all ports in the ideal tap is around 0 dBmV flat (but this may vary based on cable length), and in response to such target inputs, output on all ports may be 10 dBmV to 18 dBmV (however, this may be scaled based on cable length and total frequency span of the system). The output on each port may be directly driven from a DAC with the need for little to no additional amplification or an isolation amp may be used that has unity gain.

Figure 7B:
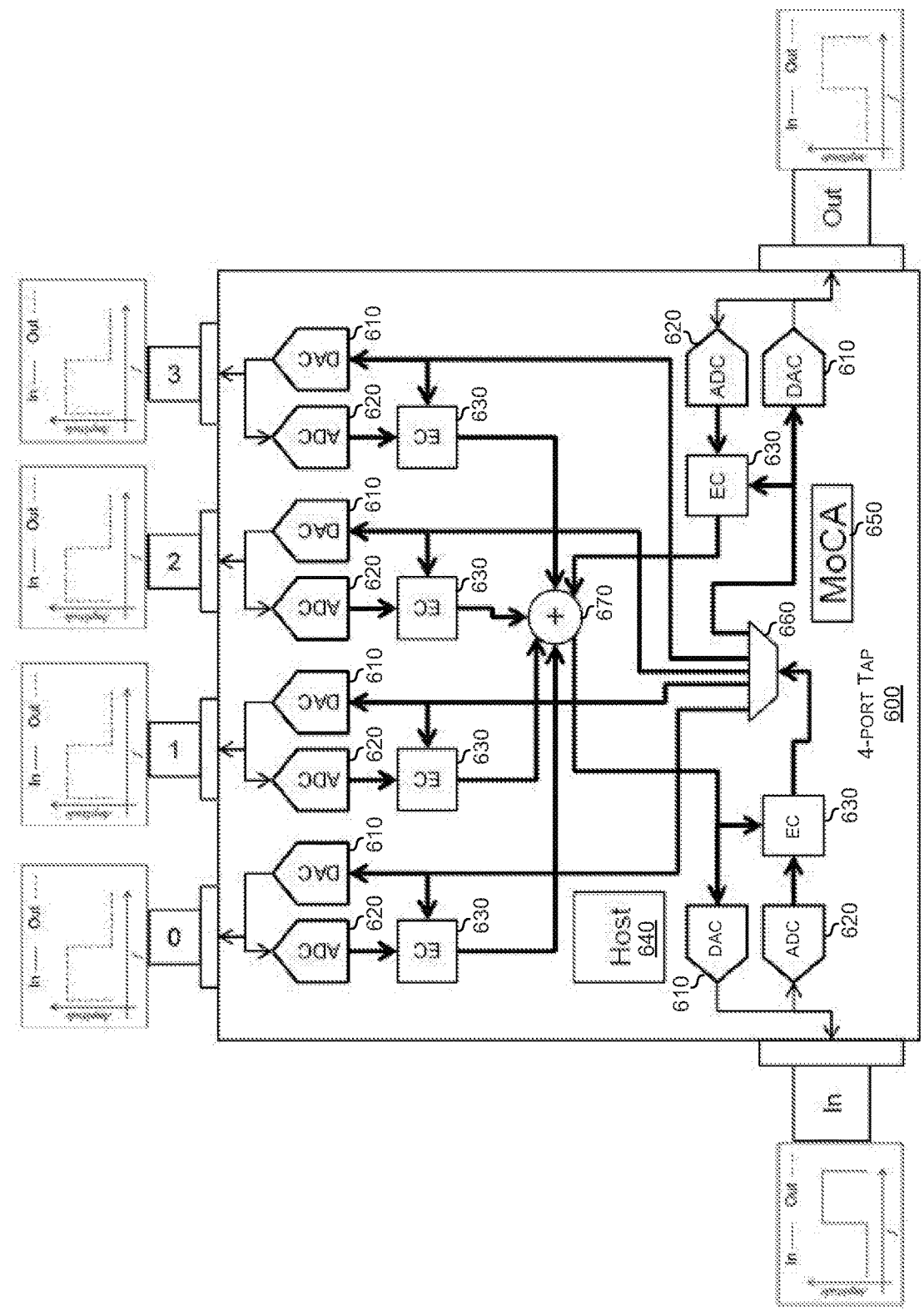
FIG. 7B illustrates use of an example N-port ideal tap to provide frequency shift spectrum.

FIG. 7B illustrates use of an example N-port ideal tap to provide frequency spectrum shift. Shown in FIG. 7B is an ideal tap in accordance with the present disclose (specifically, an instance of the ideal tap 600 described with respect to FIG. 5).

Illustrated in FIG. 7B is use of ideal taps (e.g., in cable networks) to provide frequency spectrum shift. In this regard, a portion of the frequency spectrum may be down-converted or up-converted. For example, in the particular use scenario shown in FIG. 7B, the input signal into the in-port (i.e., signal coming into the tap) may be a high frequency signal.

The ideal tap may be configured (e.g., by adjusting functionality or control parameters applicable in each of the switching paths) such that this input signal may be down-converted to low frequency signals for the tap drop-ports (e.g., tap drop-ports 0-3 bin the particular implementation shown in FIG. 7B), whereas the signal propagated from the out-port may remain similar to the input signal.

The capability to provide frequency spectrum shift may be utilized, for example, for a frequency stacking system. In this regard, use of frequency spectrum shift may allow ensuring that full band leaves the node, with a different portion of the band being consumed by each of the different taps. Thus, multiple 5-1218 MHz HFC systems for example, may ride on the same trunk cable. In this regard, each of these HFC systems may be up-shifted at the node and downshifted at participating ports. Further, HFC service groups (SGs) may be decoupled from nodes and the physical layout of the coaxial portion of the HFC system.

Figure 8A:
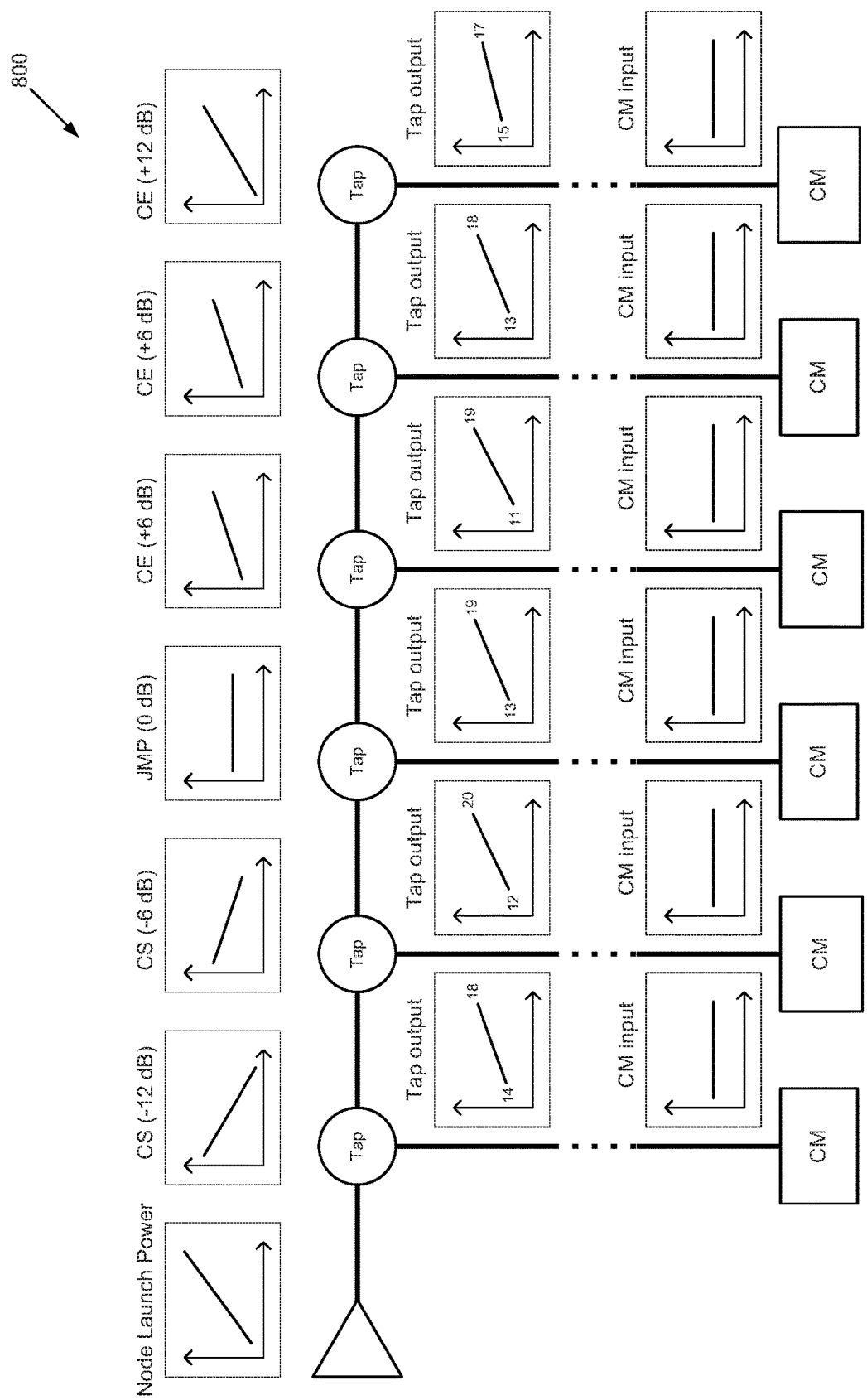
FIG. 8A illustrates an example coax design in existing networks.
Figure 8B:
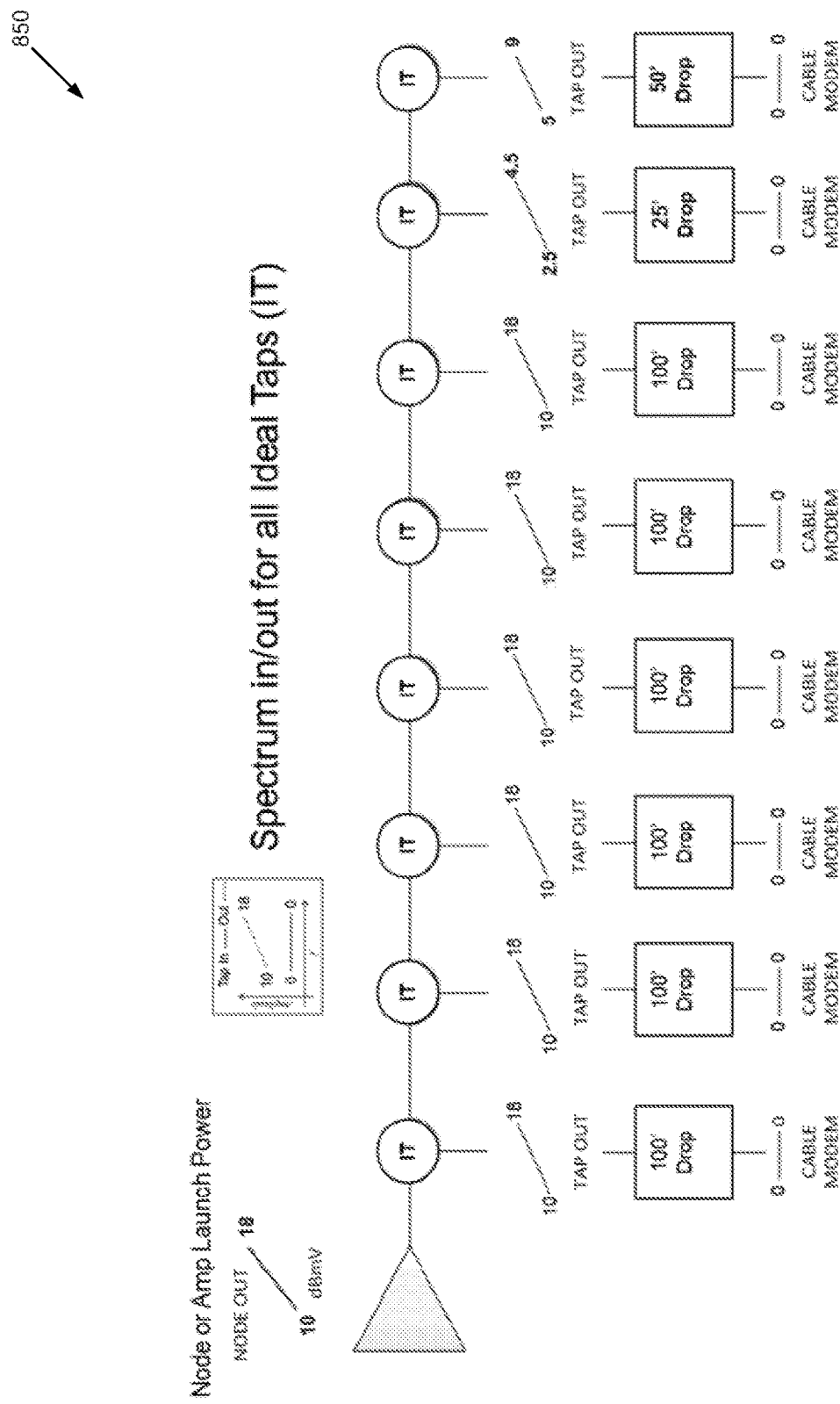
FIG. 8B illustrates an example coax design when utilizing ideal taps instead of existing taps.

FIGS. 8A and 8B illustrate example modifications in coax design when utilizing ideal taps instead of existing taps. Shown in FIGS. 8A and 8B are example cable setups 800 and 850, respectively. In this regard, cable setup 800 represents an example setup when traditional cable designs are utilized whereas cable setup 850 represents re-implementation of the same setup (e.g., providing similar performance as far as the cable modems (CMs) of the network are concerned) when using an ideal taps based design.

As illustrated in FIG. 8A, in cable setup 800, because the taps used therein are not ideal taps, the setup design must account for coaxial losses, such as by compensating through equalization at the nodes (or amplifiers). Further, some of the taps would have to incorporate different equalization modules or plug-ins—e.g., cable simulators (CS) plug-ins in taps where negative equalization is needed; cable equalizers (CE) plug-ins in taps where positive equalization is needed; and jumpers (JMP) plug-ins in taps requiring flat response (thus no adjustment).

As illustrated in FIG. 8B, due to the use of an ideal taps based design, the need for compensating at the nodes (or amplifiers), and for the need to use various equalization modules or plug-ins in the cable setup 850 is eliminated. Instead, because the characteristics of the ideal taps used in cable setup 850, each tap can be identical regardless of its position in the cable network, and yet the outputs across the whole setup are uniform resulting in the same inputs to the CMs from each tap.

Figure 9A:
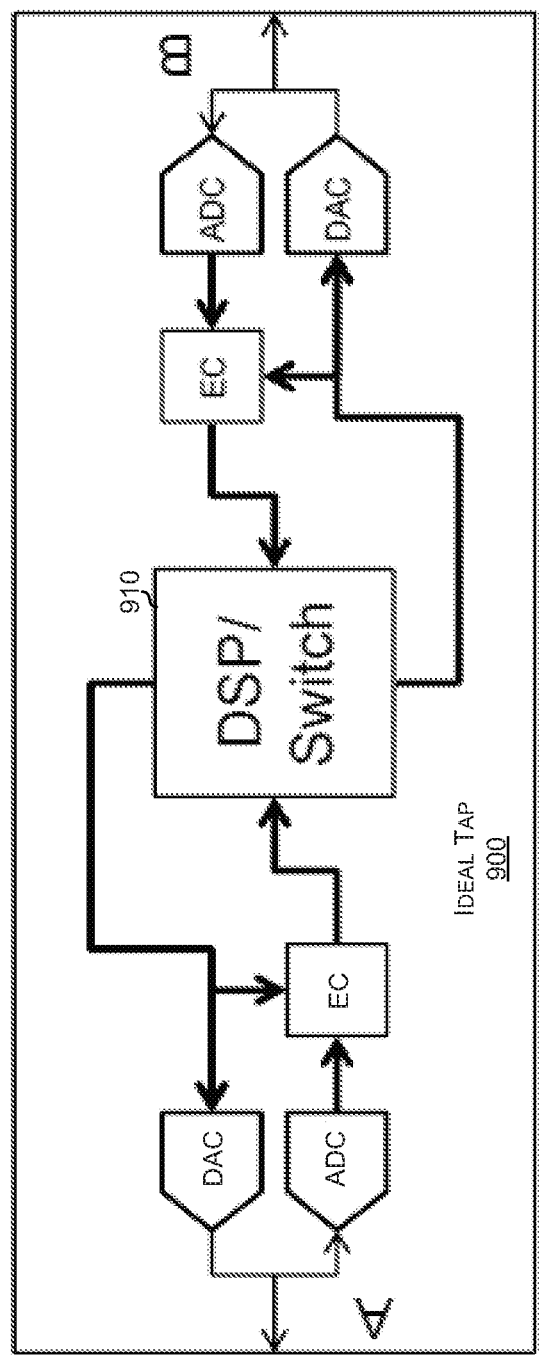

FIGS. 9A-9J illustrate various example use scenarios of ideal taps when configured for operation as 2-port digital repeaters. Shown in FIG. 9A is an ideal tap 900, in accordance with the present disclose.

In this regard, the ideal tap 900 may be substantially similar to the ideal tap 500 described with respect to FIG. 5 for example. As illustrated in FIG. 9A, the ideal tap 900 may be configured for operation as 2-port digital repeater. In this regard, two ports, A and B, may be assigned for use of the functions associated with use of the ideal tap 900 as 2-port repeater. Input to each of the two ports may be digitized (e.g., via the corresponding ADC circuit), and output of each port may synthesized. Further, each port may be configured to cancel its own echo—e.g., using the corresponding EC circuit associated therewith. The ideal tap 900 may be operable to process signals handled when the ideal tap 900 is operating as 2-port repeater.

For example, the ideal tap 900 may comprise a digital signal processor (DSP) 910, which may be substantially similar to DSP/Switch 540 described with respect to FIG. 5, which may be used in processing signals handled in the ideal tap 900 during operations as 2-port repeater. For example, the DSP 910 may interpret the signal from each port, such as by performing such functions as demodulating, decoding (e.g., forward error correction (FEC) based decoding), etc.

The DSP 910 may also generate a new signal to each port, such as by applying function as re-coding, re-modulating, etc. The DSP 910 may repeat the signal received from one port to the other port. Further, the DSP 910 may mutate the signal received from each port before sending it to the other port, such as by applying such adjustments as level shifting, frequency shifting, equalization, phase shifting, etc. However, raw DAC and ADC inputs and outputs are not available outside of the device.

Figure 9B:
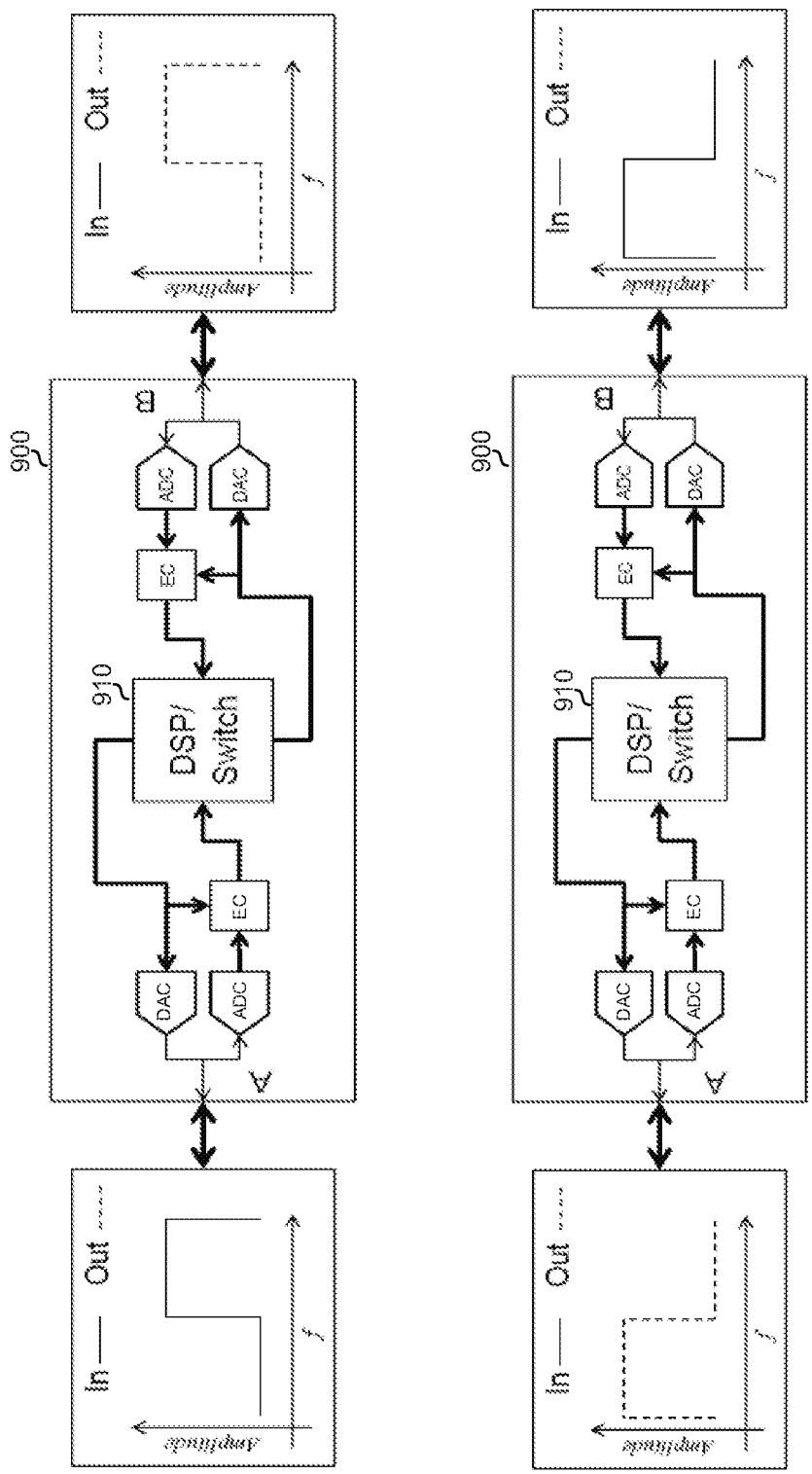

FIG. 9B illustrates an example use scenario of the ideal tap 900 when providing basic repeating functions—e.g., repeating signals without changes. In this regard, signals received at port A are sent, as received (without any changes thereto), to port B for outputting therefrom (911); and similarly, signals received at port B are sent, as received (without any changes thereto), to port A for outputting therefrom (913).

Figure 9C:
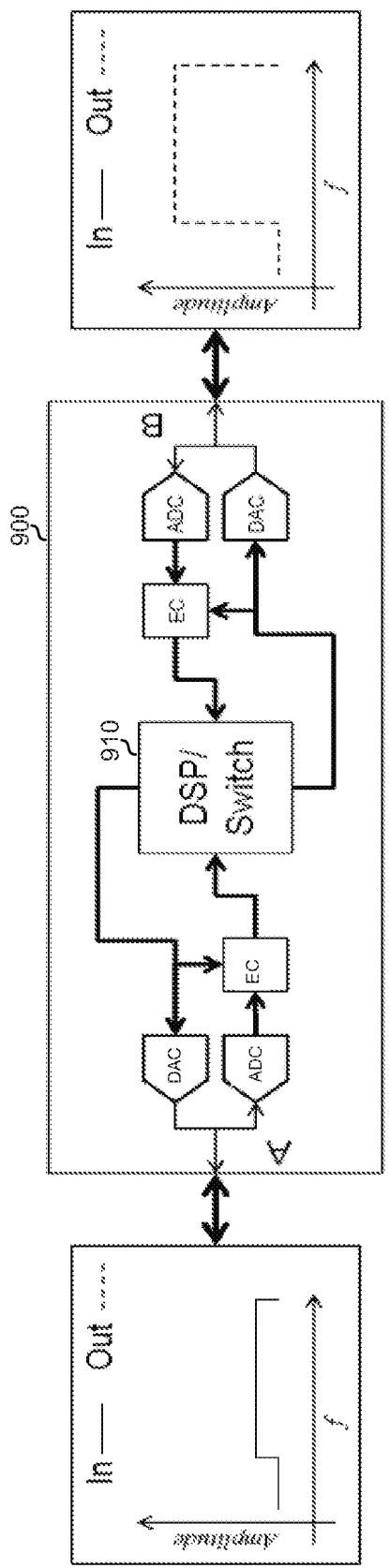

FIG. 9C illustrates an example use scenario of the ideal tap 900 when operating as 2-port repeater with power amplification—e.g., amplifying power of repeated signals. As shown in the particular use scenario illustrated in FIG. 9C, signals received at port A are sent to port B, for outputting therefrom, with increased power. The amplification may be adaptively controlled (e.g., amount of amplification applied, when to apply it or disable it, etc.), via the DSP 910 for example, such as based on particular and/or criteria (including, e.g., preset values, real-time measurements, etc.).

Figure 9D:
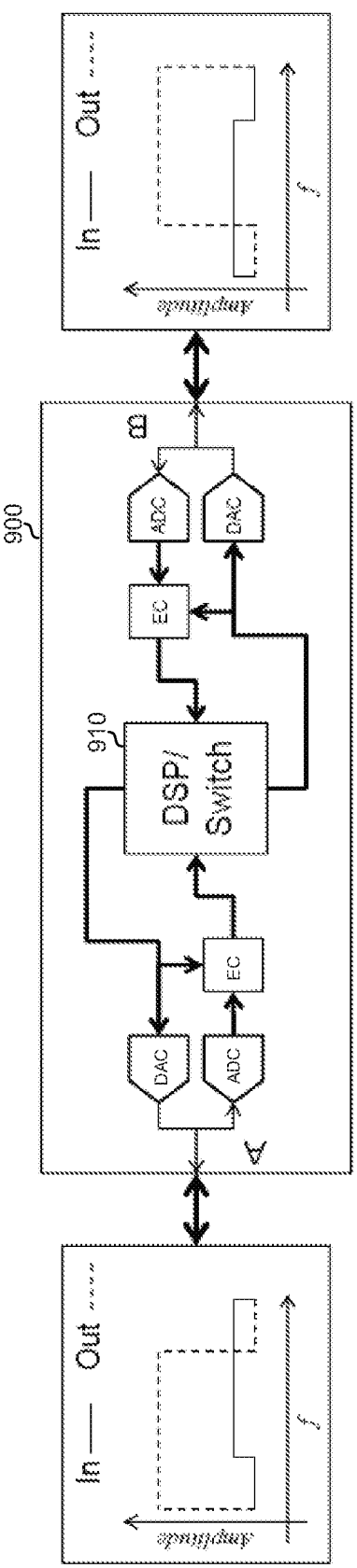

FIG. 9D illustrates an example use scenario of the ideal tap 900 when operating as 2-port amplifying full-duplex repeater—e.g., amplifying power of repeated signals concurrently and in both directions. As shown in the particular use scenario illustrated in FIG. 9D, signals received at port A are sent to port B, for outputting therefrom, with increased power, and concurrently signals received at port B are outputted from port A with increased power. This repeating with amplification may be done concurrently (in both directions: from port A to port B and from port B to port A), and repeated signals from port A to port B and from port B to port A may overlap in frequency. The amplification may be adaptively controlled (e.g., amount of amplification applied, when to apply it or disable it, etc.), via the DSP 910 for example, such as based on particular and/or criteria (including, e.g., preset values, real-time measurements, etc.).

FIG. 9E illustrates an example use scenario of the ideal tap 900 when operating as 2-port repeater with filtering—e.g., applying filtering to repeated signals. As shown in the particular use scenario illustrated in FIG. 9E, signals received at port A are sent to port B, for outputting therefrom, but with a portion of the signals filtered out (thus not 'seen' out of port B). Further, as with other use scenarios, repeating with filtering may be adaptively controlled (e.g., amount of filtering applied, when to apply it or disable it, etc.), via the DSP 910 for example, such as based on one or more particular values and/or criteria (including, e.g., preset values, real-time measurements, etc.).

FIG. 9F illustrates an example use scenario of the ideal tap 900 when operating as 2-port repeater with threshold—e.g., utilizing thresholds to control repeating signals or portions thereof. As shown in the particular use scenario illustrated in FIG. 9F, signals received at port A are sent to port B, for outputting therefrom, with the repeating of these signals controlled based on a particular threshold—e.g., based on the signals' power spectral density (PSD). Thus, only signal portions greater than the threshold are sent out, with signals portions below the threshold filtered out (not 'seen' out of port B). In this regard, portions of the input signal from port A that are below the threshold are not sent to port B.

Repeating with thresholds may be useful and utilized in certain situations, such as if it is known that "good" signals will be above a certain threshold. Thus, when the threshold (s) is/are set correctly, the non-good signal portions are not repeated. Doing so may improve performance, as it prevents transmission of signals (portions) unnecessarily, and may also reduce propagation of noise. This may be time varying. As with other use scenarios, repeating with thresholds may be adaptively controlled (e.g., the threshold values, when to apply it or disable it, etc.), via the DSP 910 for example, such as based on one or more particular values and/or criteria (including, e.g., preset values, real-time measurements, etc.).

Figure 9G:
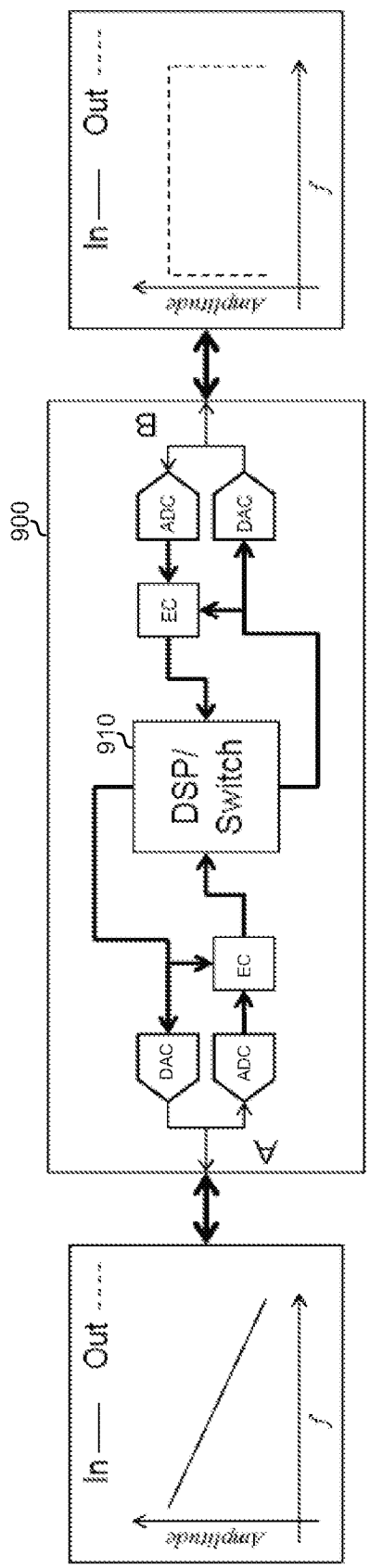

FIG. 9G illustrates an example use scenario of the ideal tap 900 when operating as 2-port repeater with equalization—e.g., applying equalization to repeated signals. As shown in the particular use scenario illustrated in FIG. 9G, signals received at port A are equalized then sent to port B, for outputting therefrom. Repeating with equalization may be utilized in certain situations, such as to counter frequency dependent loss of coaxial cables. As with other use scenarios, repeating with equalization may be adaptively controlled (e.g., amount of equalization applied, when to apply it or disable it, etc.), via the DSP 910 for example, such as based on one or more particular values and/or criteria (including, e.g., preset values, real-time measurements, etc.).

Figure 9H:
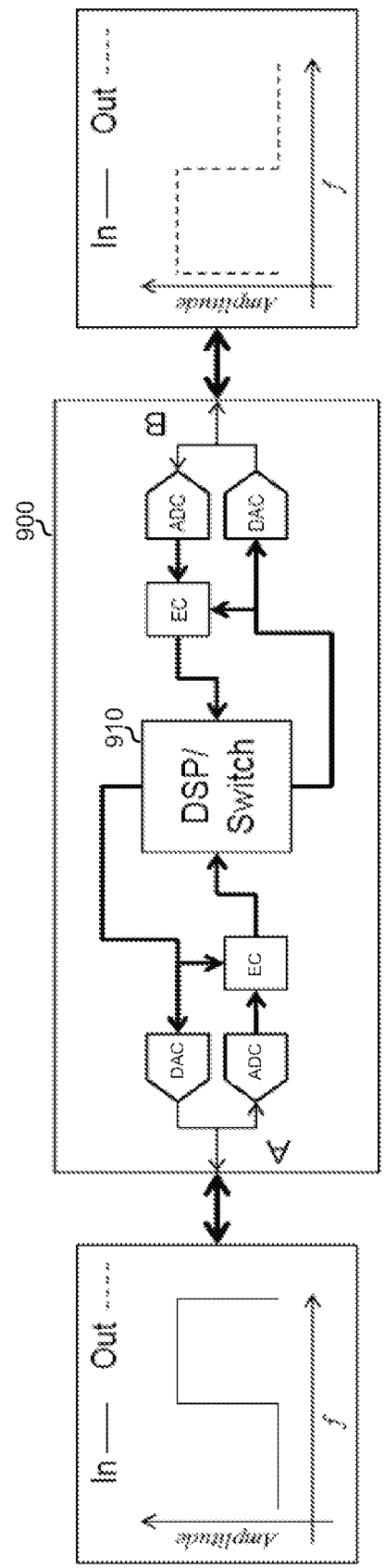

FIG. 9H illustrates an example use scenario of the ideal tap 900 when operating as 2-port repeater with frequency shift—e.g., applying frequency shift to repeated signals. As shown in the particular use scenario illustrated in FIG. 9H, signals received at port A are shifted in frequency then sent to port B, for outputting therefrom. As noted above, repeating with frequency shift may be utilized in certain situations, such as for frequency stacking/un-stacking. As with other use scenarios, repeating with frequency shift may be adaptively controlled (e.g., amount of frequency shift applied, when to apply it or disable it, etc.), via the DSP 910 for example, such as based on particular and/or criteria (including, e.g., preset values, real-time measurements, etc.).

FIG. 9 illustrates an example use scenario of the ideal tap 900 when operating as 2-port repeater with error removal—e.g., applying error removal to repeated signals. In this regard, errors introduced during propagation may be addressed based on knowledge of, e.g., the modulation used for the signals. For example, with quadrature amplitude modulation (QAM) based signals the ideal tap has some knowledge as to what the desired signal looks like. Nonetheless, the disclosure is not so limited, and may be applied similarly to other modulation schemes.

Figure 9I:
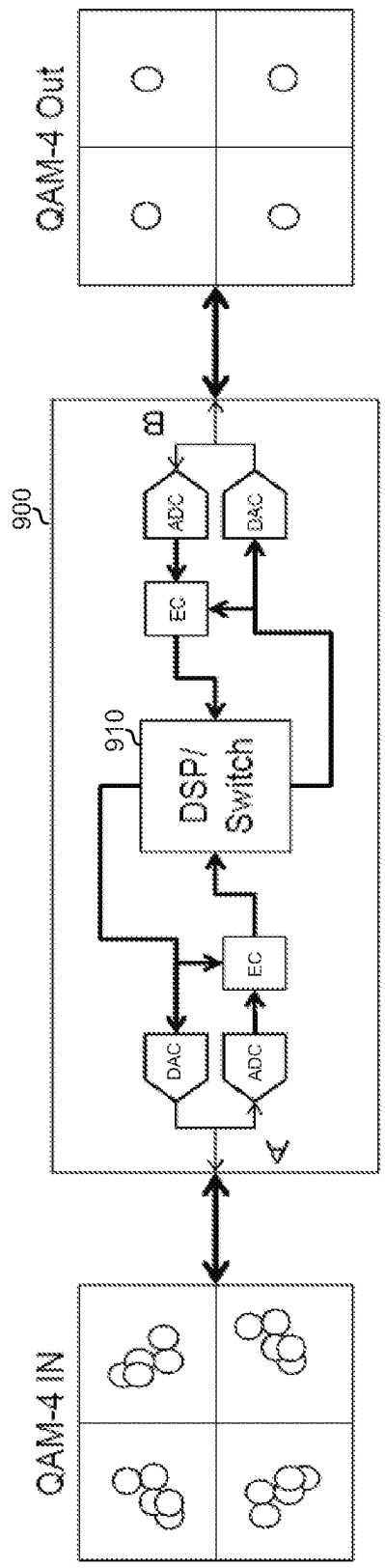

In the particular use scenario illustrated in FIG. 9I, QAM-4 is shown for ease of demonstration. The received signals may exhibit drift (as shown in chart 921). Thus, the ideal tap 900 may be operable to re-modulate QAM signals to remove drift from the desired signal. Further, in some instances, further improvements may be achieved by applying additional correction measures, such as FEC correction (as describe below with respect to FIG. 9J).

For example, in the particular use scenario illustrated in FIG. 9I, signals received at port A may have errors in modulation. Thus, the ideal tap 900 may (e.g., via the DSP 910) may demodulate the received signals to determine the errors, and after removing the drifting errors, may re-modulate the signals before being sent to port B for outputting therefrom. Hence, the outputted signals may exhibit less drift errors (as shown in chart 923). Accordingly, noise does not propagate, and the noise figure may be negative.

As with other use scenarios, repeating with error removal may be adaptively controlled (e.g., the error removal applied, when to apply it or disable it, etc.), via the DSP 910 for example, such as based on particular and/or criteria (including, e.g., preset values, real-time measurements, etc.).

Figure 9J:
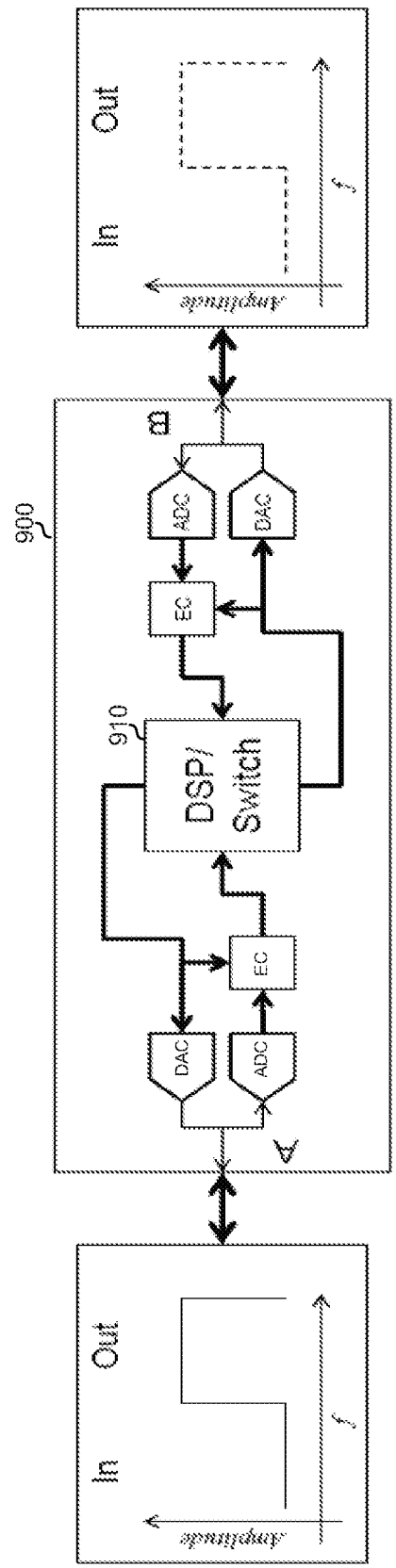

FIG. 9J illustrates an example use scenario of the ideal tap 900 when operating as 2-port repeater with forward error correction (FEC) correction—e.g., applying FEC correction to repeated signals.

In this regard, as noted above, in some instances ideal taps may be configured to incorporate use of error detection and correction measures to improve performance. This includes use of modulation error removal as described above. Performance may be further improved by use of additional correction measures, such as FEC correction. In this regard, FEC correction may be used to correct bit errors. Supporting FEC correction in this manner may require more complexity in the taps (e.g., knowledge about the signals traversing it) and may add latency. Nonetheless, the use of such correction measures would further "clean" the signal In the particular use scenario illustrated in FIG. 9J, signals received at port A may have errors in modulation. These errors may be larger than what can be corrected via re-modulation alone (as described above with respect to FIG. 9I). Thus, the ideal tap 900 may (e.g., via the DSP 910) demodulate and then decode the received signal. In this regard, modulation errors can be detected and some corrected via FEC related functions. The ideal tap 900 may then re-code the bit stream, and then re-modulate it onto the signals sent to port B, for outputting therefrom.

The use of repeating with correction (e.g., FEC correction) may allow for removing noise from the desired signals, further improving the noise figure in the network. Accordingly, the net effect of using these measures—e.g., error removal and FEC correction, allows for improved overall tap utilization—e.g., allowing for cascading many ideal taps without loss of signal or an onerous buildup of noise. This along with increased spectrum obtained by other means (e.g., use of frequency shifting) may increase (rather than decrease) the HHP per segment.

As with other use scenarios, repeating with FEC correction may be adaptively controlled (e.g., the FEC correction applied, when to apply it or disable it, etc.), via the DSP 910 for example, such as based on particular and/or criteria (including, e.g., preset values, real-time measurements, etc.).

Figure 10A:
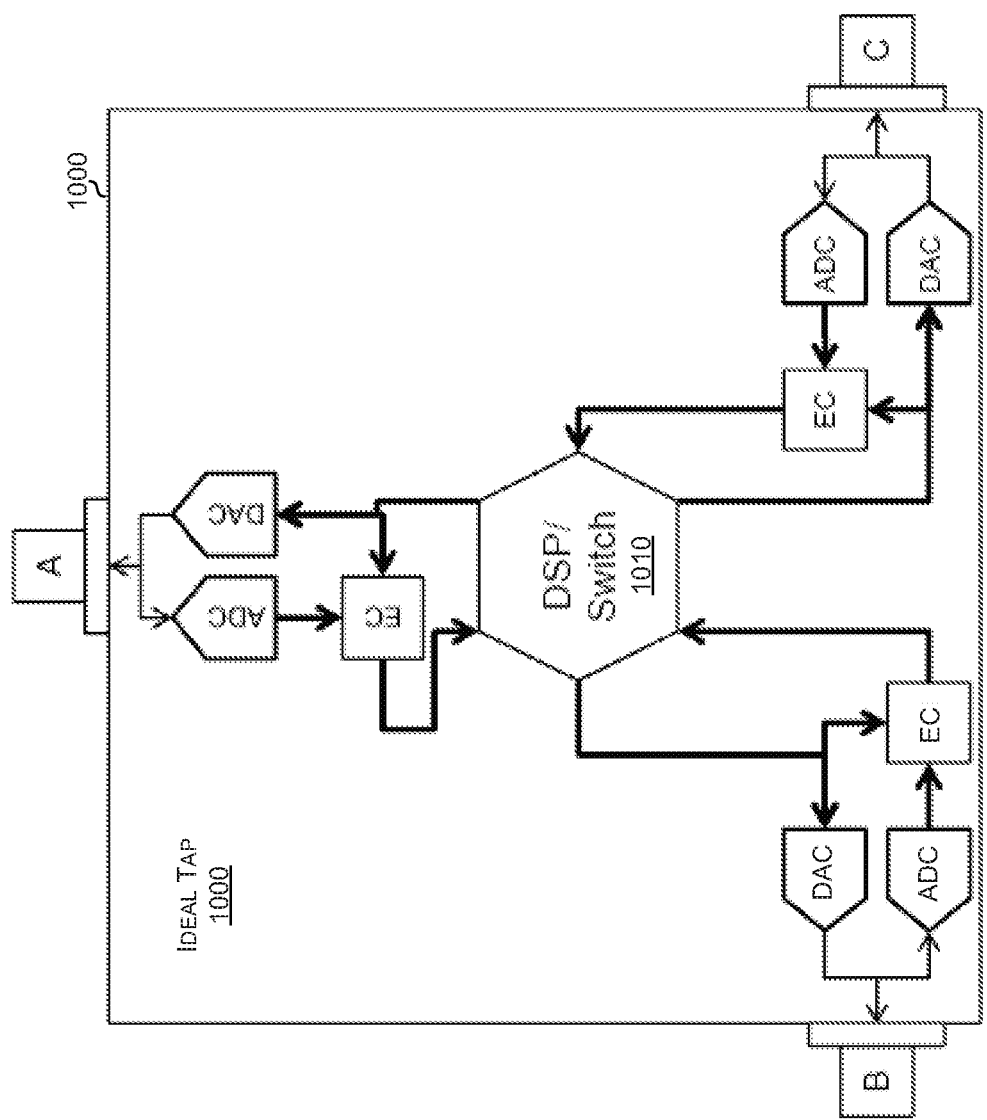
FIGS. 10A-10C illustrate various example use scenarios of ideal taps when configured for operation as 3-port digital repeaters.
Figure 10B:
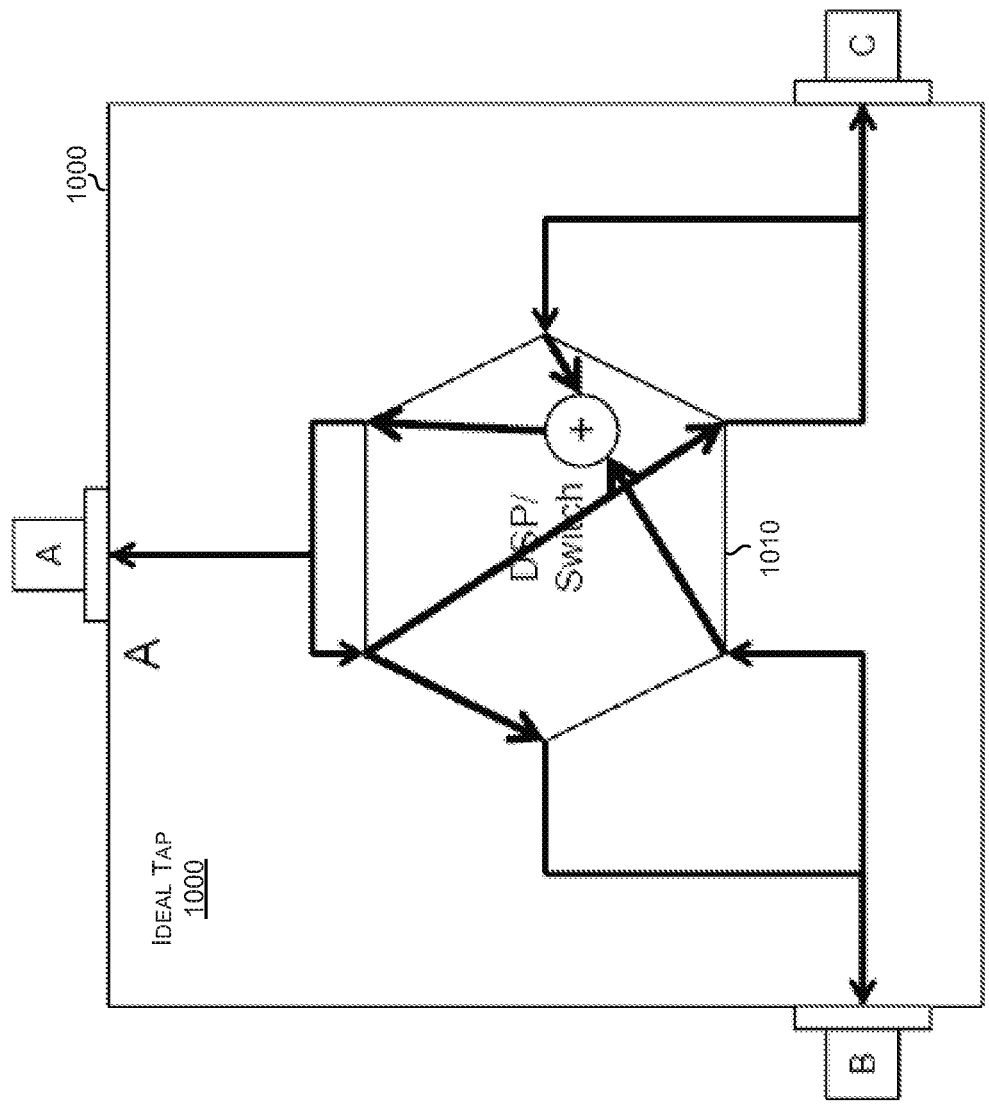
Figure 10C:
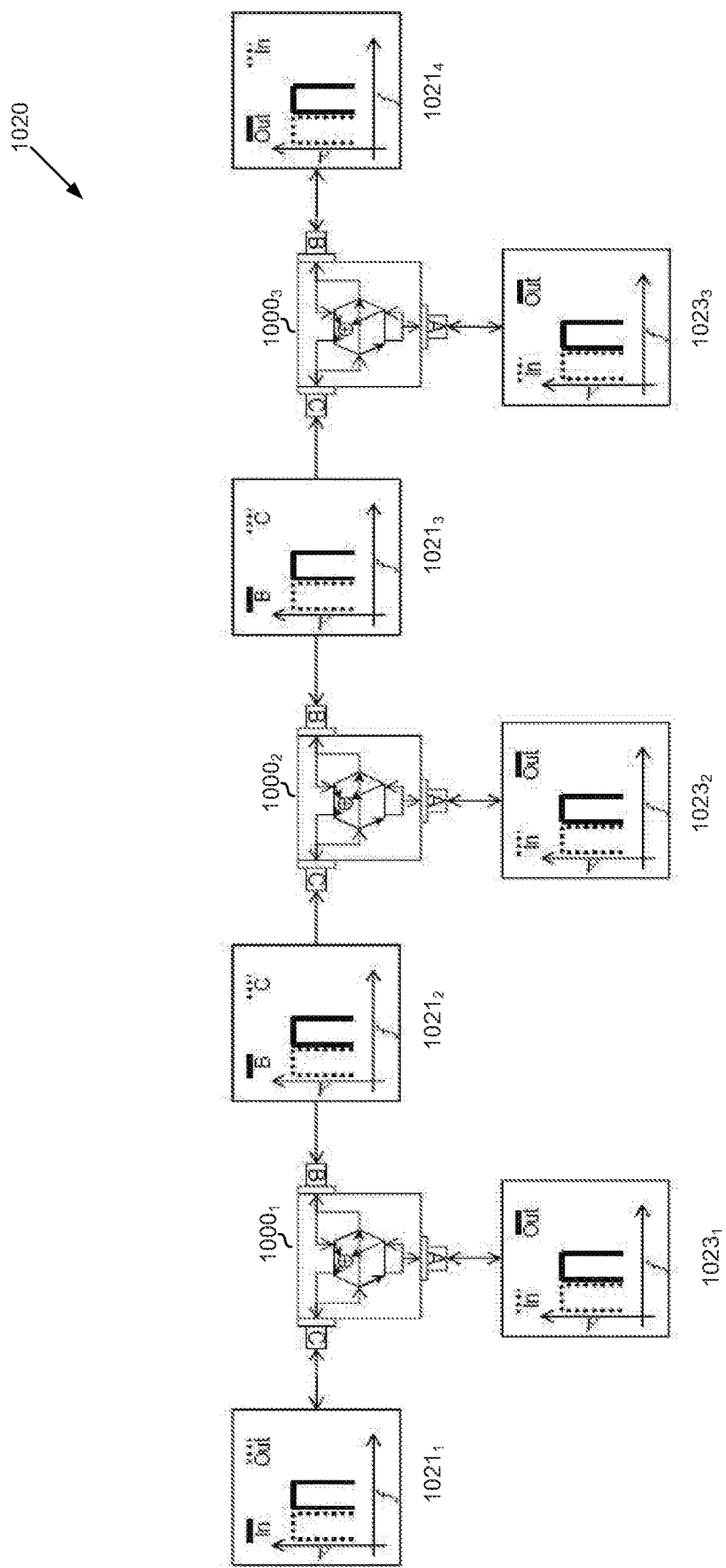

FIGS. 10A-10C illustrate various example use scenarios of ideal taps when configured for operation as 3-port digital repeaters. Shown in FIG. 10A is an ideal tap 1000, in accordance with the present disclose.

In this regard, the ideal tap 1000 may be substantially similar to the ideal tap 500 described with respect to FIG. 5 for example. As illustrated in FIG. 10A, the ideal tap 1000 may be configured for operation as 3-port digital repeater. In this regard, three ports, A, B, and C may be assigned for use in the functions associated with use of the ideal tap 1000 as 3-port repeater. In this regard, as with the 2-port repeater configuration, input to each of the three ports may be digitized (e.g., via the corresponding ADC circuit), output of each of the three ports may be synthesized, and each port may be configured to cancel its own echo—e.g., using the corresponding EC circuit associated therewith. Further, the ideal tap 1000 may be operable to process signals handled when the ideal tap 1000 is operating as 3-port repeater. In this regard, the ideal tap 1000 may comprise a digital signal processor (DSP) 1010, which may be substantially similar to DSP/switch 560 described with respect to FIG. 5, which may be used in processing signals handled in the ideal tap 1000 during operations as 3-port repeater.

In operation, the ideal tap 1000 when configured as a 3-port repeater may be operable to perform all the functions associated with the 2-port repeater configuration—e.g., as described above with respect to FIG. 9A-9J. However, the 3-port repeater configuration may allow for additional functions. For example, the 3-port repeater configuration may allow for replication with 0 loss or gain—that is, the ability to send signals from the input of one port to both of the other ports at the same level or greater than the level at which the signals were received. Further, the 3-port repeater configuration may allow for summing of the inputs from multiple ports and outputting of that sum to one or more ports. These added features, and others, are described in more detail below.

FIG. 10B illustrates an example use scenario of the ideal tap 1000 when configured as 3-port repeater. In this regard, as noted above, the 3-port repeater configuration may allow for sending signals from the input of one port (referred to as "common port") to both of the other ports, and/or for outputting the sum of inputs from multiple ports from such common port. In the example use shown in FIG. 10B, port A may be assigned as common ports. Thus, input of (signals received at) port A are sent to both of port B and port C for outputting therefrom. On the other hand, inputs of both of port B and port C are summed and sent to port A for outputting therefrom.

Thus, during operation, high isolation is provided between port B and port C—e.g., input at port C not sent to port B and input at port B not sent to port C. Such arrangement may result in various improvements. For example, no 3 dB splitting or combining loss may occur. Further, gain may be applied, adaptively in various paths— e.g., port A→port B, port A→port C, and port B+port C→port A. While port A is the common port in the example use scenario shown in FIG. 10B, this is not always required. Thus, any one of the three ports (port A, port B, and port C) may be assigned as the common port, and this assignment need not be fixed (e.g., the common port can be different in time), and the common port may be different in frequency, Further, there may be isolation between the non-common ports can vary vs. frequency and time.

In some instances, particular transmission and/or reception criteria may be assigned to one or more of the ports— e.g., MoCA signals may be passed between port B and port C, but are not sent to port A.

FIG. 10C illustrates an example use scenario of a cascade of ideal taps configured as 3-port repeater as a 1-port RF tap. In this regard, in the example use shown in FIG. 10C, three ideal taps $1000_1$-$1000_3$ (each an instance of the ideal tap 1000) are each configured as 3-port repeater, and with one of the 3 port in each of these taps (port C as shown in FIG. 10C) being assigned as the tap in-port, with one of the 3 ports in each of these taps (port B as shown in FIB. 10C) being assigned as the tap out-port, and the last of the 3 ports in each of these taps (port A as shown in FIG. 10C) being assigned as the tap drop-port. The three taps are then cascaded in the manner shown in FIG. 10C, whereby each of subsequent taps connects to the previous taps out-port via its in-port. This arrangement allows for separation between the inputs and outputs at each port as shown in FIG. 10C (charts $1021_1$-$1021_4$ and $1023_1$-$1023_3$).

While FIG. 10C shows all taps as 3-port repeaters used as 1-port taps, each of the taps shown could be comprised of N-port taps, such as the embodiment shown in FIGS. 5 and 6. The number of ports for each tap would vary according to the design guidelines used to implement the system. Just as existing RF taps come in multiple port configurations today, it is expected that a number of variations will be available of the N-port tap where N varies.

In various implementations in accordance with the present disclosure, a distributed low gain amplification methodology may be used to optimize the design and implementation of cable networks.

In this regard, signal level from nodes to CPEs no longer drives plant design. Rather, only a single length of trunk or coax cable needs to be considered. Target input to each tap may be 0 dBmV. Output, functionality, and configuration of each tap may be controlled, e.g., within the ideal tap (e.g., CPU in the ASIC of the tap) automatically via echo training and/or controlled remotely via a cloud based controller. The plant designer may need to ensure that the max cable length is not exceeded. In this regard, max cable length may be determined by the dynamic range of the ideal tap receivers.

The plant designer may further need to configure taps to, e.g., enable or disable ports for both US and DS direction, enable portions of the spectrum to repeat, enable threshold PSD controlled repeating or continuous repeating, enable or disable frequency shifting on all or some of the spectrum, configure which ports should be summed together to the in port, etc. The number of ideal taps in cascade may only be limited by spectrum consumption. In this regard, tap cascades may be very long—e.g., hundreds of taps arranged in cascaded manner may be possible if demand is low enough or spectrum is high enough. The CPE may operate at a lower frequency than the pass band of the ideal tap. Further, several "channels" may be stacked on the trunk line, and then a specific channel for a specific CPE is down-converted on the port to which the specific CPE is attached.

As noted above, ideal taps provide solutions to the problems with traditional HFC design. Less RF expertise may be required to design with ideal taps. The need for particular equalization modules and/or profiles at different taps (e.g., CSs and CEs) may be eliminated. Rather, port-by-port equalization may be performed. Ideal taps have high isolation. In this regard, neighboring CPE cannot 'hear' each other. TDD systems or other in-home systems, such as MoCA networks and related transceivers, may work within the ideal taps. Further, FDX operations at the CPE may be possible. Ideal taps have high return loss. In this regard, noise from micro-reflections may be reduced, and as such FDX may be simplified. Ideal Taps are active components. Thus, taps may be monitored remotely; may change configuration remotely (e.g., port enable/disable); may block ingress noise; may notch out undesired spectrum, etc. Ideal taps may also measure RF metrics of each port including "full-spectrum" capture and report these metrics to a remote computer or controller.

Despite the improved performance offered by the ideal tap, total power consumption and HHP may be low. In this regard, high gain amps are removed (e.g., 38 dBmV output form the node, 38 dBmV TCP at the CPE, etc.). CPEs may consume less power, even with FDX. All CPEs transmit at lower power, even those far from the node or AMP. Further, nodes consume less power (e.g., 80% less) per HHP. MER performance is High (e.g., MERs in the mid-50s and 32K and 64K QAM may be possible). The use of ideal taps may result in higher HHP per Segment, as cable design is no longer RF signal limited. Frequency allocation for US and DS directions may be flexible in designs based on ideal taps. This may allow for elimination of diplexers. Further, spectrum allocation is unique for each tap port. Thus, every CPE can get the split between US and DS that provides its best performance.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
a tap configured for use in a coaxial network, the tap comprising:
   a plurality of ports that comprises at least:
      a first port configured for receiving downstream (DS) signals from and transmitting upstream (US) signals to one or more nodes upstream from the tap within the coaxial network; and
      one or more other ports, the one or more other ports comprising at least one of:
         a second port configured for transmitting downstream (DS) signals to and receiving upstream (US) signals from one or more nodes downstream from the tap within the coaxial network;
         a drop port configured for receiving signals from and transmitting signals to customer premise equipment (CPE) in the coaxial network; and
   one or more processing circuits for handling signals received and transmitted via the tap;
   wherein:
      the one or more processing circuits are configured to meet predefined tap performance criteria, the particular predefined tap performance criteria comprising one or more of high return loss, high port-to-port isolation, and positive port-to-port gain; and
      the one or more processing circuits are configured to, when handling signals, apply frequency shifting based on one or more frequency spectrum shift conditions.

2. The system of claim 1, wherein the one or more processing circuits comprise one or more per-port circuits for handling transmission and reception of signals via each of the plurality of ports.

3. The system of claim 1, wherein the one or more processing circuits comprise one or more switching circuits configured for handling routing of signals within the tap, between different ports from the plurality of ports.

4. The system of claim 1, wherein the one or more processing circuits, when handling signals, apply one or more of digitization, demodulation, decoding, level shifting, phase shifting, equalization, amplification, and filtering.

5. The system of claim 1, wherein the one or more processing circuits, when handling signals, detect errors in the signals, and apply corresponding error corrections.

6. The system of claim 1, wherein the one or more processing circuits, when handling signals, detect noise in the signals, and apply corresponding noise removal adjustments.

7. The system of claim 1, wherein the one or more processing circuits are configured to, when processing at least some of the signals, apply spectrum related adjustments.

8. The system of claim 1, wherein the one or more processing circuits are configured to, when processing at least some of the signals, remove particular spectrum regions, the removed particular regions comprising undesired frequency regions.

9. The system of claim 1, wherein the one or more processing circuits are configured to, when processing at least some of the signals, shift particular spectrum used or occupied by particular signals.

10. The system of claim 1, wherein the one or more processing circuits are configured to, when processing at least some of the signals, assign unique spectrum region to each of the plurality of ports.

11. The system of claim 1, wherein the tap is configurable to operate as a repeater, wherein during operation as the repeater the tap:
   receives one or more signals via one or more ports of the plurality of ports;
   processes the one or more signals;
   generates, based on processing of the one or more signals, one or more corresponding transmit signals; and
   transmits the one or more corresponding transmit signals via one or more other ones of the plurality of ports.

12. The system of claim 1, wherein the tap is configurable to enable remote control of at least some of functions provided or performed in the tap by another node in the coax network.

13. The system of claim 1, wherein each port of the plurality of ports is configurable to provide full duplex operation.

14. The system of claim 2, wherein the one or more per-port circuits comprise a digital-to-analog converter (DAC) circuit, an analog-to-digital converter (ADC) circuit, and an echo cancelation (EC) circuit.

15. The system of claim 14, wherein the echo cancelation (EC) circuit is configured for cancelling echo on a corresponding port.

16. The system of claim 3, wherein the one or more switching circuits comprise a multiplexer circuit and a combiner circuit, wherein the multiplexer circuit and the combiner circuit are configurable to provide routing paths within the tap for routing signals received via one of the plurality of ports to another one of the plurality of ports.

17. The system of claim 3, wherein the one or more switching circuits comprise a digital signal processor (DSP) circuit that routes signals received via one of the plurality of ports to another one of the plurality of ports.

18. The system of claim 17, wherein the one or more switching circuits comprise a digital signal processor (DSP) circuit apply one or more digital signal processing to the routed signals.

19. The system of claim 11, wherein the tap, when processing the one or more signals and/or generating the one or more corresponding transmit signals, adjust one or more characteristics of at least one of the one or more signals.

20. The system of claim 19, wherein the tap, when adjusting one or more characteristics of at least one of the one or more signals, apply one or more of level shifting, frequency shifting, phase shifting, equalization, amplification, removing signal parts based on particular thresholds.

* * * * *